(12) United States Patent
Sugawara et al.

(10) Patent No.: US 11,120,577 B2
(45) Date of Patent: Sep. 14, 2021

(54) POSITION MEASUREMENT SYSTEM, WORK MACHINE, AND POSITION MEASUREMENT METHOD

(71) Applicant: Komatsu Ltd., Tokyo (JP)

(72) Inventors: Taiki Sugawara, Tokyo (JP); Hiroyoshi Yamaguchi, Tokyo (JP); Shogo Atsumi, Tokyo (JP); Yasuo Kanemitsu, Tokyo (JP)

(73) Assignee: Komatsu Ltd., Tokyo (JP)

( * ) Notice: Subject to any disclaimer, the term of this patent is extended or adjusted under 35 U.S.C. 154(b) by 679 days.

(21) Appl. No.: 16/069,560

(22) PCT Filed: Feb. 7, 2018

(86) PCT No.: PCT/JP2018/004257
§ 371 (c)(1),
(2) Date: Jul. 12, 2018

(87) PCT Pub. No.: WO2018/147340
PCT Pub. Date: Aug. 16, 2018

(65) Prior Publication Data
US 2021/0209799 A1   Jul. 8, 2021

(30) Foreign Application Priority Data
Feb. 9, 2017   (JP) .............................. JP2017-022570

(51) Int. Cl.
*H04N 13/243* (2018.01)
*G06T 7/80* (2017.01)
(Continued)

(52) U.S. Cl.
CPC ............. *G06T 7/85* (2017.01); *H04N 13/128* (2018.05); *H04N 13/243* (2018.05); *H04N 13/246* (2018.05); *H04N 2013/0081* (2013.01)

(58) Field of Classification Search
CPC ...... G06T 7/85; H04N 13/243; H04N 13/128; H04N 13/246; H04N 2013/0081
See application file for complete search history.

(56) References Cited

U.S. PATENT DOCUMENTS 5,430,547 A    7/1995  Takagi et al.
9,219,911 B2   12/2015 Ushiki et al.
(Continued)

FOREIGN PATENT DOCUMENTS

CN       1078550 A     11/1993
CN     101577795 A     11/2009
(Continued)

OTHER PUBLICATIONS

International Search Report dated May 15, 2018, issued for PCT/JP2018/004257.

*Primary Examiner* — Tung T Vo
(74) *Attorney, Agent, or Firm* — Locke Lord LLP

(57) ABSTRACT

A position measurement system includes: an image data acquisition unit that acquires first image data photographed by a first camera of a first stereo camera provided at a work machine and second image data photographed by a second camera of the first stereo camera; a stereo measurement unit that executes stereo measurement on the basis of the first image data, the second image data, and parameters related to the first camera and the second camera; a first adjustment unit that changes at least a part of the parameters to adjust a stereo ratio of first disparity image data subjected to stereo measurement; and a second adjustment unit that changes at least a part of the parameters to adjust a scale of first three-dimensional data obtained from the first disparity image data.

11 Claims, 15 Drawing Sheets

(51) Int. Cl.
*H04N 13/128* (2018.01)
*H04N 13/246* (2018.01)
*H04N 13/00* (2018.01)

(56) References Cited

U.S. PATENT DOCUMENTS

| | | | |
|---|---|---|---|
| 10,233,615 | B2 | 3/2019 | Yamaguchi et al. |
| 2008/0162004 | A1 | 7/2008 | Price et al. |
| 2011/0018973 | A1 | 1/2011 | Takayama |
| 2011/0254925 | A1 | 10/2011 | Ushiki et al. |
| 2014/0236477 | A1* | 8/2014 | Chen .............. G07C 5/008 701/450 |
| 2015/0305238 | A1* | 10/2015 | Klausmann ......... A01D 41/127 701/50 |
| 2016/0137125 | A1* | 5/2016 | Petrany ............ H04N 7/181 348/148 |
| 2017/0094154 | A1 | 3/2017 | Kawamoto et al. |
| 2017/0107698 | A1 | 4/2017 | Yamaguchi et al. |

FOREIGN PATENT DOCUMENTS

| | | |
|---|---|---|
| CN | 102223550 A | 10/2011 |
| CN | 104093013 A | 10/2014 |
| CN | 105518221 A | 4/2016 |
| CN | 105518228 A | 4/2016 |
| JP | 09-133525 A | 5/1997 |
| JP | 10-341458 A | 12/1998 |
| JP | 2001-055762 A | 2/2001 |
| JP | 2008-045983 A | 2/2008 |
| JP | 2012-233353 A | 11/2012 |
| JP | 2014-215039 A | 11/2014 |
| JP | 2016-118400 A | 6/2016 |
| JP | 2016-200557 A | 12/2016 |
| JP | 6060525 B2 | 1/2017 |
| WO | 2008/079192 A1 | 7/2008 |
| WO | 2009/119229 A1 | 10/2009 |
| WO | 2016/013691 A1 | 1/2016 |
| WO | 2016/047808 A1 | 3/2016 |

* cited by examiner

POSITION MEASUREMENT SYSTEM, WORK MACHINE, AND POSITION MEASUREMENT METHOD

FIELD

The present invention relates to a position measurement system, a work machine, and a position measurement method.

BACKGROUND

In a technical field related to work machines, there is a known excavator having a stereo camera as disclosed in Patent Literature 1.

CITATION LIST

Patent Literature

Patent Literature 1: Japanese Patent Application Laid-open No. 2012-233353 A

SUMMARY

Technical Problem

A stereo camera has a first camera and a second camera and performs three-dimensional measurement on the basis of the principle of triangulation. In the stereo camera, calibration processing to adjust a relative position between the first camera and the second camera is executed. The calibration processing of the stereo camera includes processing to photograph a calibration target with the first camera and the second camera. In a case where the relative position between the first camera and the second camera is changed after the calibration processing of the stereo camera, recalibration processing has to be executed for the stereo camera. In a case where a calibration target is needed to be photographed in every recalibration processing, work in the recalibration processing becomes complex, and working efficiency of the work machine is deteriorated.

An aspect of the present invention is to smoothly execute the recalibration processing and suppress deterioration of working efficiency.

Solution to Problem

According to a first aspect of the present invention, a position measurement system comprises: an image data acquisition unit configured to acquire first image data photographed by a first camera of a first stereo camera provided at a work machine and second image data photographed by a second camera of the first stereo camera; a stereo measurement unit configured to execute stereo measurement on the basis of the first image data, the second image data, and parameters related to the first camera and the second camera; a first adjustment unit configured to change at least a part of the parameters to adjust a stereo ratio of first disparity image data subjected to stereo measurement; and a second adjustment unit configured to change at least a part of the parameters to adjust a scale of first three-dimensional data obtained from the first disparity image data.

Advantageous Effects of Invention

According to the aspect of the present invention, recalibration processing can be smoothly executed, and deterioration of working efficiency can be suppressed.

DESCRIPTION OF EMBODIMENTS

Figure 1:
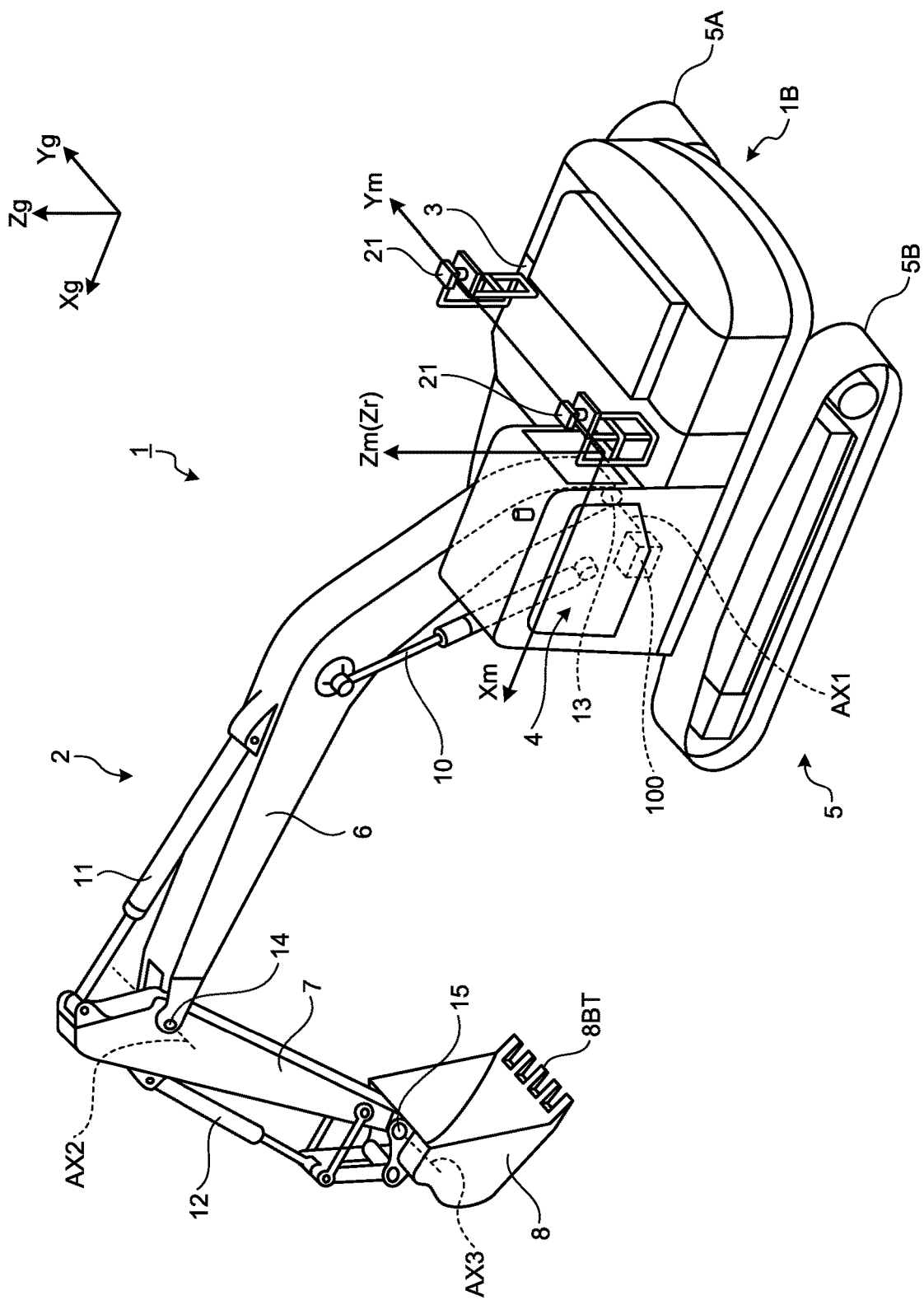
FIG. 1 is a perspective view illustrating an exemplary work machine according to a first embodiment.

In the following, embodiments of the present invention will be described with reference to the drawings, but the present invention is not limited thereto. Note that constituent elements of the respective embodiments described below can be suitably combined. Additionally, some of the constituent elements may not be used.

In the following description, positional relations of respective portions will be described while defining a three-dimensional global coordinate system (Xg, Yg, Zg), a three-dimensional vehicle body coordinate system (Xm, Ym, Zm), and a three-dimensional camera coordinate system (Xs, Ys, Zs).

The global coordinate system is a coordinate system in which an origin fixed on the earth is set as a reference. The global coordinate system is a coordinate system defined by a global navigation satellite system (GNSS). The GNSS represents a global navigation satellite system. A global positioning system (GPS) can be exemplified as an example of the global navigation satellite system.

The global coordinate system is defined by: an Xg axis on a horizontal plane; a Yg axis orthogonal to the Xg axis on the horizontal plane; and a Zg axis orthogonal to the Xg axis and Yg axis. A rotation or inclination direction around the Xg axis is defined as a θXg direction, a rotation or inclination direction around the Yg axis is defined as a θYg direction, and a rotation or inclination direction around the Zg axis is defined as a θZg direction.

The Zg axis direction is a vertical direction.

The vehicle body coordinate system is defined by: an Xm axis on a first predetermined plane in which an origin defined in a vehicle body of a work machine is set as a reference; a Ym axis orthogonal to the Xm axis on the first predetermined plane; a Zm axis orthogonal to the Xm axis and Ym axis. A rotation or inclination direction around the Xm axis is defined as a θXm direction, a rotation or inclination direction around the Ym axis is defined as a θYm direction, and a rotation or inclination direction about the Zm axis is defined as a θZm direction. The Xm axis direction is a front-back direction of the work machine, the Ym axis direction is a vehicle width direction of the work machine, and the Zm axis direction is a vertical direction of the work machine.

The camera coordinate system is defined by: an Xs axis on a second predetermined plane in which an origin defined by a camera is set as a reference; a Ys axis orthogonal to the Xs axis on the second predetermined plane; and the Zs axis orthogonal to the Xs axis and Ys axis. A rotation or inclination direction around the Xs axis is defined as a θXs direction, a rotation or inclination direction around the Ys axis is defined as a θYs direction, and a rotation or inclination direction about the Zs axis is defined as a θZs direction. The Xs axis direction is a vertical direction of the camera, the Ys axis direction is a width direction of the camera, and the Zs axis direction is a front-back direction of the camera. The Zs axis direction is parallel to an optical axis of an optical system of the camera.

First Embodiment

[Work Machine]

FIG. 1 is a perspective view illustrating an exemplary work machine 1 according to the present embodiment. In the present embodiment, an example in which the work machine 1 is an excavator will be described. In the following description, the work machine 1 will be suitably referred to as an excavator 1.

As illustrated in FIG. 1, the excavator 1 includes a vehicle body 1B and a work unit 2. The vehicle body 1B includes a swing body 3 and a travel body 5 supporting the swing body 3 in a swingable manner.

The swing body 3 has an operating room 4. A hydraulic pump and an internal combustion engine are arranged in the swing body 3. The swing body 3 can swing around a swing axis Zr. The swing axis Zr is parallel to the axis Zm of the vehicle body coordinate system. In the present embodiment, an origin of the vehicle body coordinate system is defined at a center of a swing circle of the swing body 3. The center of the swing circle is positioned at the swing axis Zr of the swing body 3.

The travel body 5 has crawlers 5A, 5B. The excavator 1 travels by rotation of the crawlers 5A, 5B. In the present embodiment, the Zm axis of the vehicle body coordinate system is orthogonal to ground contact surfaces of the crawlers 5A, 5B. An upward direction (+Zm direction) of the vehicle body coordinate system is a direction away from the ground contact surfaces of the crawlers 5A, 5B, and a downward direction (−Zm direction) of the vehicle body coordinate system is a direction opposite to the upward direction of the vehicle body coordinate system.

The work unit 2 is connected to the swing body 3. In the vehicle body coordinate system, at least a part of the work unit 2 is arranged more on a front side than the swing body 3 is. A frontward direction (+Xm direction) of the vehicle body coordinate system is a direction in which the work unit 2 exists while setting the swing body 3 as a reference, and a backward direction (−Xm direction) of the vehicle body coordinate system is a direction opposite to the frontward direction of the vehicle body coordinate system.

The work unit 2 includes: a boom 6 connected to the swing body 3; an arm 7 connected to the boom 6; a bucket 8 connected to the arm 7; a boom cylinder 10 that drives the boom 6; an arm cylinder 11 that drives the arm 7; and a bucket cylinder 12 that drives the bucket 8. Each of the boom cylinder 10, arm cylinder 11, and bucket cylinder 12 is a hydraulic cylinder driven by hydraulic pressure.

The boom 6 is rotatably connected to the swing body 3 via a boom pin 13. The arm 7 is rotatably connected to a distal end portion of the boom 6 via an arm pin 14. The bucket 8 is rotatably connected to a distal end portion of the arm 7 via a bucket pin 15. The boom pin 13 includes a rotation axis AX1 of the boom 6 with respect to the swing body 3. The arm pin 14 includes a rotation axis AX2 of the arm 7 with respect to the boom 6. The bucket pin 15 includes a rotation axis AX3 of the bucket 8 with respect to the arm 7. The rotation axis AX1 of the boom 6, rotation axis AX2 of the arm 7, and rotation axis AX3 of the bucket 8 are parallel to the Ym axis of the vehicle body coordinate system.

[Stereo Camera]

Figure 2:
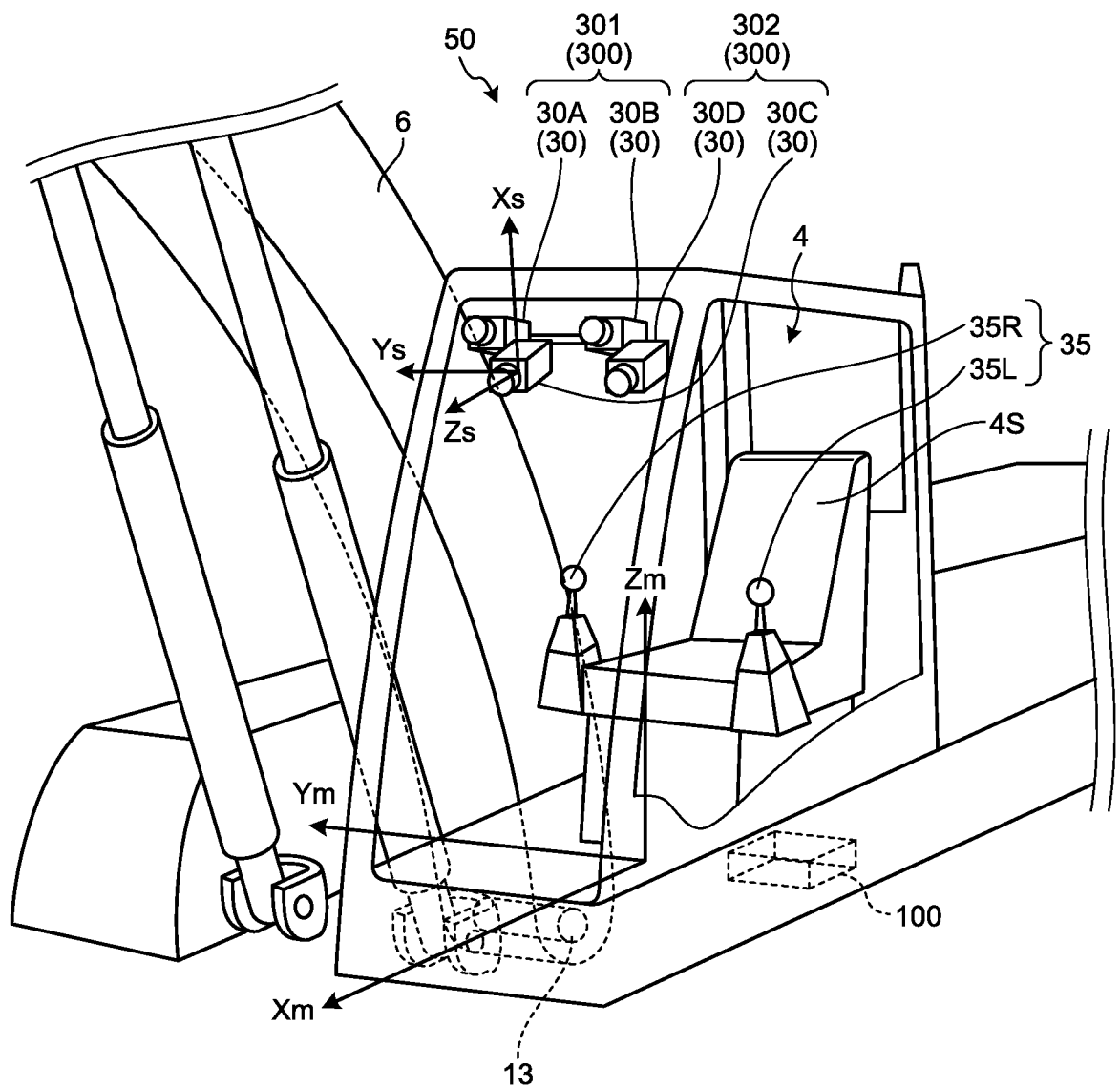
FIG. 2 is a perspective view illustrating an exemplary stereo camera according to the first embodiment.

Next, a stereo camera 300 according to the present embodiment will be described. FIG. 2 is a perspective view illustrating an example of the stereo camera 300 according to the present embodiment. As illustrated in FIG. 2, the excavator 1 has the stereo camera 300. The stereo camera 300 is a camera that can also acquire data in a depth direction of a photographing subject SB by simultaneously photographing the photographing subject SB from a plurality of different directions.

In the present embodiment, the photographing subject SB includes a construction object to be constructed in a construction site. The construction object includes an excavation object to be excavated by the work unit 2 of the excavator 1. Note that the construction object may also be a construction object to be constructed by a work machine different from the excavator 1 or a construction object constructed by a worker. Additionally, the construction object is a general idea including a construction object before construction, a construction object under construction, and a construction object after construction.

The stereo camera 300 is provided at the swing body 3. In the present embodiment, the stereo camera 300 is provided inside the operating room 4. For example, the stereo camera 300 is arranged frontward (+Xm direction) and upward (+Zm direction) of the operating room 4. The stereo camera 300 photographs a photographing subject SB in front of the excavator 1.

The stereo camera 300 has a plurality of cameras 30. Each of the cameras 30 has an optical system and an image sensor. The image sensor includes a couple charged device (CCD) image sensor or a complementary metal oxide semiconductor (CMOS) image sensor. In the present embodiment, the cameras 30 include four cameras 30A, 30B, 30C, and 30D. Note that the stereo cameras 300 do not necessarily have four cameras 30, and at least a pair of cameras 30 is sufficient.

Among a plurality of cameras 30, the stereo camera 300 is formed of a combination of two cameras 30. In the present embodiment, the stereo camera 300 includes: a first stereo camera 301 formed of a combination of cameras 30A and 30B; and a second stereo camera 302 formed of a combination of cameras 30C and 30D.

The cameras 30A and 30C are arranged more on the +Ym side (the work unit 2 side) than the cameras 30B and 30D are. The cameras 30A and 30B are arranged spaced apart from each other in the Ym axis direction. The camera 30C and the camera 30D are arranged spaced apart from each other in the Ym axis direction. The cameras 30A and 30B are arranged more on the +Zm side than the cameras 30C and 30D are. The camera 30A and the camera 30B are arranged at substantially the same position in the Zm axis direction. The camera 30C and the camera 30D are arranged at substantially the same position in the Zm axis direction.

In the present embodiment, the cameras 30A and 30B are directed upward (+Zm direction). The cameras 30C and 30D are directed downward (in the −Zm direction). Furthermore, the cameras 30A and 30C are directed frontward (+Xm direction). The cameras 30B and 30D are directed to slightly the +Ym side (work unit 2 side) from the front side. In other words, the cameras 30A and 30C are directed to the front side of the swing body 3, and the cameras 30B and 30D are directed to the cameras 30A and 30C sides respectively. Meanwhile, the cameras 30B and 30D may be also directed to the front side of the swing body 3 and the cameras 30A and 30C may also be directed to the cameras 30B and 30D sides respectively.

The camera 30 performs stereo photographing for a photographing subject SB existing in front of the swing body 3. The photographing subject SB is three-dimensionally measured by using stereo image data by a pair of cameras 30, and three-dimensional data DG of the photographing subject SB is calculated. The three-dimensional data DG of the photographing subject SB is three-dimensional data DG of a ground surface corresponding to a surface of a construction object. The three-dimensional data DG of the photographing subject SB includes three-dimensional shape data of the photographing subject SB in the global coordinate system.

A camera coordinate system is defined for each of the plurality of cameras 30. The camera coordinate system is a coordinate system in which an origin fixed in a camera 30 is set as a reference. A Zs axis of the camera coordinate system coincides with an optical axis of an optical system of the camera 30.

In the following description, the camera 30A of the first stereo cameras 301 will be suitably referred to as a first camera 30A, and the other camera 30B will be suitably referred to as a second camera 30B. Also, the camera 300 of the second stereo cameras 302 will be suitably referred to as a third camera 30C, and the other camera 30D will be suitably referred to as a fourth camera 30D.

As illustrated in FIG. 2, an operator's seat 4S and an operating device 35 are arranged in the operating room 4. The operating device 35 is operated by an operator in order to operate the work unit 2 and the swing body 3. The operating device 35 includes a right operating lever 35R and a left operating lever 35L. An operator boarding the operating room 4 operates the operating device 35 to drive the work unit 2 and swing the swing body 3.

[Detection System]

Figure 3:
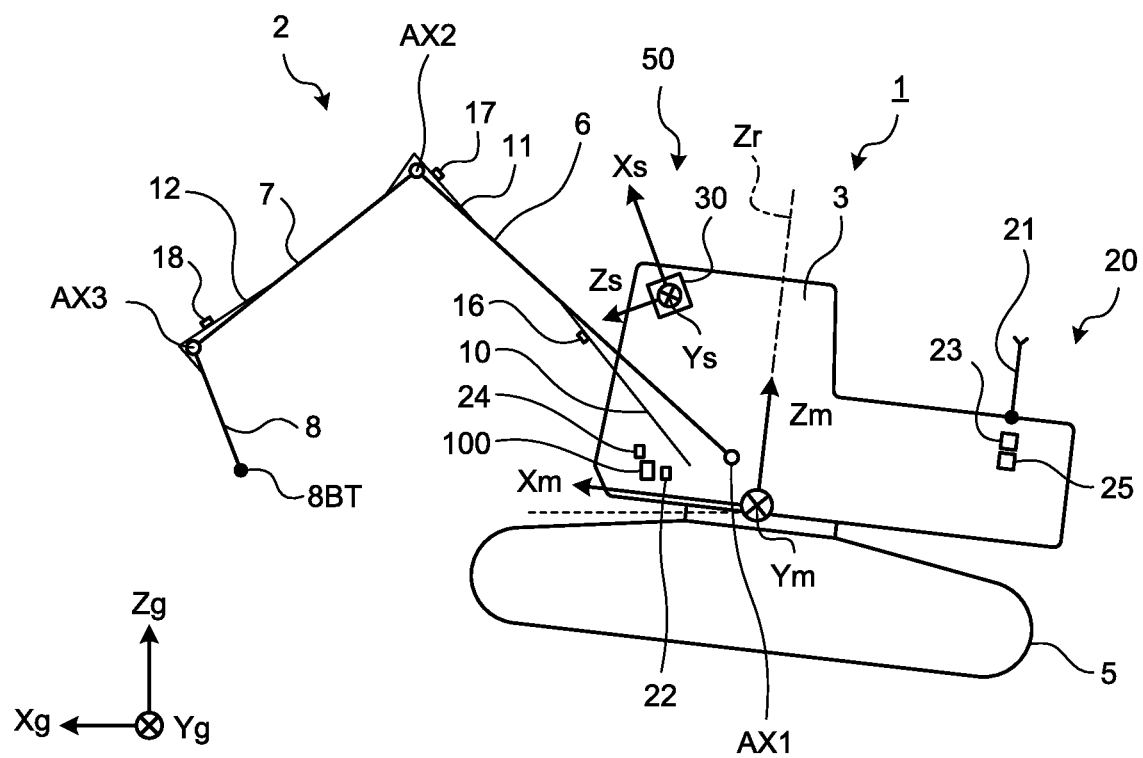
FIG. 3 is a diagram schematically illustrating an exemplary detection system according to the first embodiment.

Next, a detection system 20 of the excavator 1 according to the present embodiment will be described. FIG. 3 is a diagram schematically illustrating an exemplary detection system 20 according to the present embodiment. As illustrated in FIG. 3, the detection system 20 includes: a work unit angle detector 22 to detect an angle of the work unit 2; a position detector 23 to detect a position of the swing body 3; a posture detector 24 to detect a posture of the swing body 3; and an azimuth direction detector 25 to detect an azimuth direction of the swing body 3.

The position detector 23 includes a GPS receiver. The position detector 23 is provided at the swing body 3. The position detector 23 detects an absolute position that is a position of the swing body 3 defined in the global coordinate system. The absolute position of the swing body 3 includes coordinate data in the Xg axis direction, coordinate data in the Yg axis direction, and coordinate data in the Zg axis direction.

A GPS antenna 21 is provided at the swing body 3. For example, two GPS antennas 21 are arranged in the Ym axis direction of the vehicle body coordinate system. Each of the GPS antennas 21 receives a radio wave from a GPS satellite and outputs, to the position detector 23, a signal generated on the basis of the received radio wave. The position detector 23 detects an absolute position that is a position of each of the GPS antennas 21 defined in the global coordinate system on the basis of a signal supplied from the GPS antenna 21.

The position detector 23 calculates an absolute position of the swing body 3 by executing arithmetic processing on the basis of at least one of the absolute positions of the two GPS antennas 21. The absolute position of the swing body 3 may be an absolute position of one of the GPS antennas 21 or may be a position between an absolute position of one GPS antenna 21 and an absolute position of the other GPS antenna 21.

The posture detector 24 includes an inertial measurement unit (IMU). The posture detector 24 is provided at the swing body 3. The posture detector 24 calculates an inclination angle of the swing body 3 with respect to a horizontal plane (Xg-Yg plane) defined in the global coordinate system. The inclination angle of the swing body 3 with respect to the horizontal plane includes: an inclination angle of the swing body 3 in a rotational direction around the Ym axis; and an inclination angle of the swing body 3 in a rotational direction around the Xm axis.

The posture detector 24 detects an acceleration rate and an angular velocity acting on the posture detector 24. An acceleration rate and an angular velocity acting on the swing body 3 are detected by detecting the acceleration rate and the angular velocity acting on the posture detector 24. The posture of the swing body 3 is derived from the acceleration rate and the angular velocity acting on the swing body 3.

The azimuth direction detector 25 calculates an azimuth direction of the swing body 3 with respect to a reference azimuth direction defined in the global coordinate system on the basis of an absolute position of one GPS antenna 21 and an absolute position of the other GPS antenna 21. The reference azimuth direction is, for example, north. The azimuth direction detector 25 calculates a straight line that connects the absolute position of one GPS antenna 21 and the absolute position of the other GPS antenna 21, and calculates an azimuth direction of the swing body 3 with respect to the reference azimuth direction on the basis of an angle formed between the calculated straight line and the reference azimuth direction. The azimuth direction of the swing body 3 with respect to the reference azimuth direction includes an azimuth direction angle indicating an angle formed between the reference azimuth direction and the azimuth direction of the swing body 3.

The work unit 2 includes: a boom stroke sensor 16 arranged at the boom cylinder 10 and detecting a boom stroke indicating a drive amount of the boom cylinder 10; an arm stroke sensor 17 arranged at the arm cylinder 11 and detecting an arm stroke indicating a drive amount of the arm cylinder 11; and a bucket stroke sensor 18 arranged in the bucket cylinder 12 and detecting a bucket stroke indicating a drive amount of the bucket cylinder 12.

The work unit angle detector 22 detects an angle of the boom 6, an angle of the arm 7, and an angle of the bucket 8. The work unit angle detector 22 calculates a boom angle indicating an inclination angle of the boom 6 with respect to the Zm axis of the vehicle body coordinate system on the basis of a boom stroke detected by the boom stroke sensor 16. The work unit angle detector 22 calculates an arm angle indicating an inclination angle of the arm 7 with respect to the boom 6 on the basis of an arm stroke detected by the arm stroke sensor 17. The work unit angle detector 22 calculates a bucket angle indicating an inclination angle of a blade edge 8BT of the bucket 8 with respect to the arm 7 on the basis of a bucket stroke detected by the bucket stroke sensor 18.

Note that the boom angle, arm angle, and bucket angle may also be detected by, for example, an angle sensor provided at the work unit 2 instead of using the stroke sensors.

[Position Measurement System]

Figure 4:
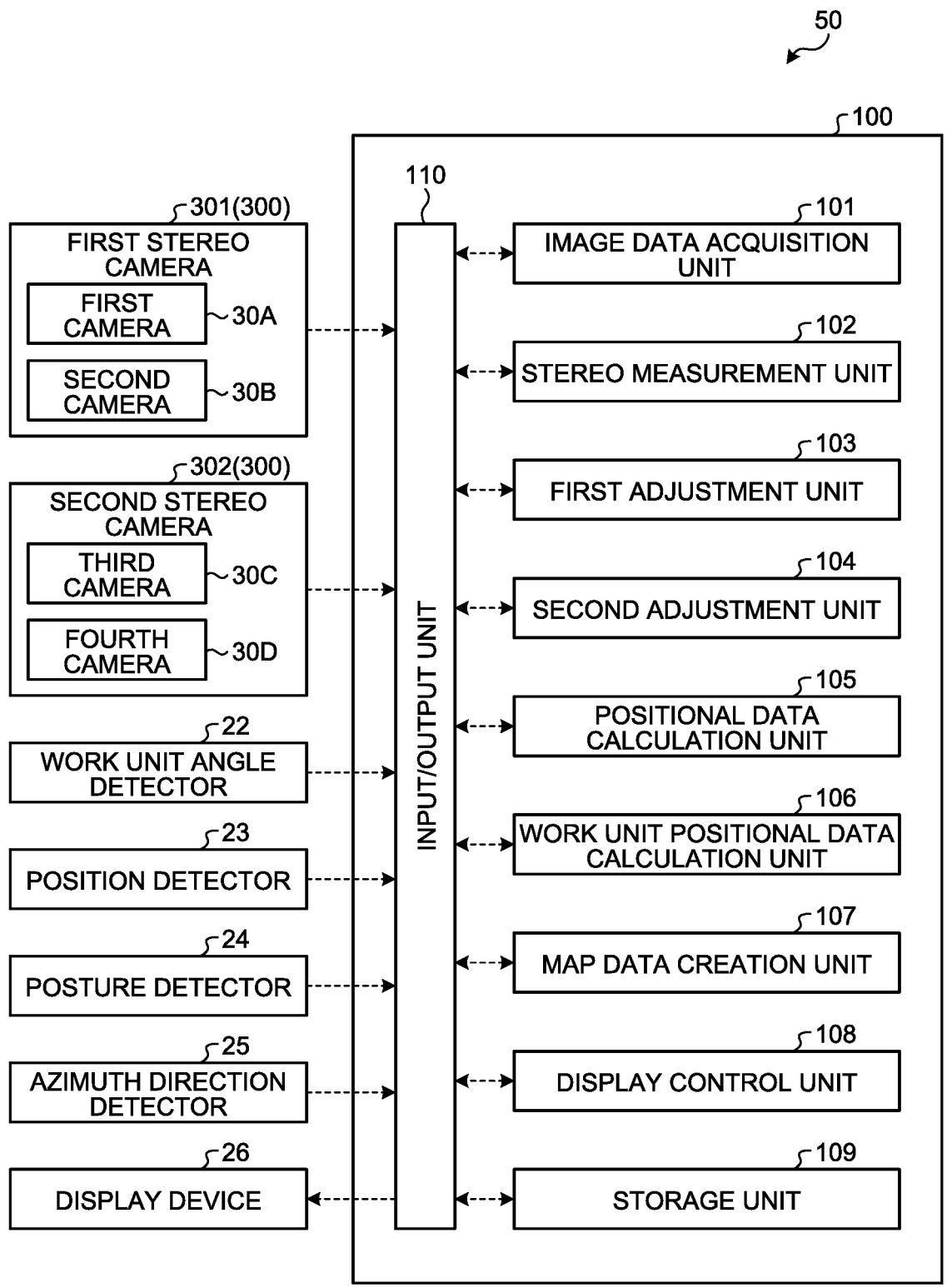
FIG. 4 is a functional block diagram illustrating an exemplary position measurement system according to the first embodiment.

Next, a position measurement system 50 according to the present embodiment will be described. FIG. 4 is a functional block diagram illustrating an exemplary position measurement system 50 according to the present embodiment. In the present embodiment, the position measurement system 50 is provided in the excavator 1.

The position measurement system 50 includes: the stereo camera 300 including the first stereo camera 301 and the second stereo camera 302; the work unit angle detector 22; the position detector 23; the posture detector 24; the azimuth direction detector 25; a display device 26; and a control device 100. The control device 100 is provided at the swing body 3 of the excavator 1.

The display device 26 includes a flat panel display such as a liquid crystal display (LCD) or an organic electroluminescence (EL) display (OELD).

The control device 100 includes a computer system. The control device 100 has: an arithmetic processing device including a processor such as a central processing unit (CPU); a storage device including a volatile memory such as a random access memory (RAM) and a nonvolatile memory such as a read only memory (ROM); and an input/output interface.

The control device 100 has an image data acquisition unit 101, a stereo measurement unit 102, a first adjustment unit 103, a second adjustment unit 104, a positional data calculation unit 105, a work unit positional data calculation unit 106, a map data creation unit 107, a display control unit 108, a storage unit 109, and an input/output unit 110.

The arithmetic processing device has respective functions of the image data acquisition unit 101, stereo measurement unit 102, first adjustment unit 103, second adjustment unit 104, positional data calculation unit 105, work unit positional data calculation unit 106, map data creation unit 107, and display control unit 108. The storage device has a function of the storage unit 109. The input/output interface has the function of the input/output unit 110.

The stereo camera 300, work unit angle detector 22, position detector 23, posture detector 24, azimuth direction detector 25, and display device 26 are connected to the input/output unit 110. The image data acquisition unit 101, stereo measurement unit 102, first adjustment unit 103, second adjustment unit 104, positional data calculation unit 105, work unit positional data calculation unit 106, map data creation unit 107, display control unit 108, storage unit 109, stereo camera 300, work unit angle detector 22, position detector 23, posture detector 24, azimuth direction detector 25, and display unit 26 can perform data communication via the input/output unit 110.

The image data acquisition unit 101 acquires: first image data MR1 of a photographing subject SB photographed by the first camera 30A; second image data ML1 of the photographing subject SB photographed by the second camera 30B; third image data MR2 of the photographing subject SB photographed by the third camera 30C; and fourth image data ML2 of the photographing subject SB photographed by the fourth camera 30D, in which all of the cameras are provided in the excavator 1. In other words, the image data acquisition unit 101 acquires pieces of stereo image data photographed by at least a pair of cameras 30 of the stereo camera 300.

The storage unit 109 stores a plurality of parameters related to the first camera 30A and the second camera 30B of the first stereo camera 301 and a plurality of parameters related to the third camera 30C and the fourth camera 30D of the second stereo camera 302. The parameters can be obtained by predetermined calibration work.

The parameters include a plurality of external parameters defining a relative position between the first camera 30A and the second camera 30B of the first stereo camera 301 and a plurality of external parameters defining a relative position between the third camera 30C and the fourth camera 30D of the second stereo camera 302.

The external parameters include a parameter indicating a relative position between a pair of cameras 30 of the stereo camera 300 related to six directions including the Xs axis direction, the Ys axis direction, the Zs axis direction, a θXs axis direction, a θYs axis direction, and a θZs axis direction.

Additionally, the parameters include internal parameters of the first camera 30A, second camera 30B, third camera 30C, and fourth camera 30D respectively. The internal parameters define specific data of each of the plurality of cameras 30. The internal parameters include, for example, a focal distance of an optical system of a camera 30 and a positional deviation amount between an image center of the an image sensor and an intersection between an optical axis of the optical system of the camera 30 and an imaging surface of the image sensor.

The stereo measurement unit 102 applies stereoscopic image processing to the first image data MR1 and second image data ML1 acquired by the image data acquisition unit 101, and calculates three-dimensional data DG of a photographing subject SB in the camera coordinate system. Additionally, the stereo measurement unit 102 applies the stereoscopic image processing to the third image data MR2 and fourth image data ML2 acquired by the image data acquisition unit 101 and calculates three-dimensional data DG of the photographing subject SB in the camera coordinate system.

Furthermore, the stereo measurement unit 102 applies coordinate conversion to the three-dimensional data DG of the photographing subject SB in the camera coordinate system, and calculates three-dimensional data DG of the photographing subject SB in the vehicle body coordinate system. Additionally, the stereo measurement unit 102 applies coordinate conversion to the three-dimensional data DG of the photographing subject SB in the vehicle body coordinate system, and calculates three-dimensional data DG of the photographing subject SB in the global coordinate system.

The three-dimensional data DG of the photographing subject SB includes pieces of coordinate data at a plurality of points within the photographing subject SB. The stereo measurement unit 102 generates disparity image data SG by applying the stereoscopic image processing to two pieces of image data MR (MR1, MR2) and ML (ML1, ML2) of the photographing subject SB photographed by the two different cameras 30, and obtains three-dimensional data DG by arithmetic processing.

In the present embodiment, the stereo measurement unit 102 executes stereo measurement on the basis of: the first image data MR1 acquired by the image data acquisition unit 101; the second image data ML1 acquired by the image data acquisition unit 101; and the parameters stored in the storage unit 109. Additionally, the stereo measurement unit 102 executes stereo measurement on the basis of: the third image data MR2 acquired by the image data acquisition unit 101; the fourth image data ML2 acquired by the image data acquisition unit 101; and the parameters stored in the storage unit 109.

The first adjustment unit 103 adjusts a stereo ratio by changing at least a part of the plurality of parameters stored in the storage unit 109. The stereo ratio indicates a ratio of pixels in which stereo measurement has been successfully performed among a plurality of pixels of the disparity image data SG subjected to the stereo measurement. In the present embodiment, for example, in a case where one camera 30 of the stereo camera 300 is displaced and the stereo ratio is degraded, the first adjustment unit 103 changes a parameter stored in the storage unit 109 so as to improve the stereo ratio.

The second adjustment unit 104 adjusts a scale of the three-dimensional data DG generated by the stereo measurement unit 102 by changing at least a part of the plurality of parameters stored in the storage unit 109. In the present embodiment, the second adjustment unit 104 changes a parameter stored in the storage unit 109 so as to reduce a difference between a reference scale and a scale of the three-dimensional data DG.

The positional data calculation unit 105 calculates positional data of a camera 30 in the global coordinate system on the basis of positional data of the swing body 3, posture data of the swing body 3, azimuth direction data of the swing body 3, and positional data of the camera 30 in the vehicle body coordinate system.

The positional data calculation unit 105 acquires the positional data of the swing body 3 from the position detector 23, acquires the posture data of the swing body 3 from the posture detector 24, and acquires the azimuth direction data of the swing body 3 from the azimuth direction detector 25. The positional data of the swing body 3 indicates an absolute position of the swing body 3 in the global coordinate system. The posture data of the swing body 3 indicates a posture of the swing body 3 in the global coordinate system. The azimuth direction data of the swing body 3 indicates an azimuth direction of the swing body 3 in the global coordinate system.

The storage unit 109 stores positional data of a camera 30 in the vehicle body coordinate system. The positional data of the camera 30 in the vehicle body coordinate system is known data derived from design data or specification data of each of the excavator 1 and the camera 30, and is stored in the storage unit 109. The positional data calculation unit 105 calculates a position of an origin of the vehicle body coordinate system in the global coordinate system on the basis of the positional data of the swing body 3, posture data of the swing body 3, and azimuth direction data of the swing body 3. The positional data calculation unit 105 calculates positional data of a camera 30 in the global coordinate system on the basis of the positional data of the swing body 3, posture data of the swing body 3, azimuth direction data of the swing body 3, and positional data of the camera 30 in the vehicle body coordinate system stored in the storage unit 109.

The work unit positional data calculation unit 106 acquires, from the work unit angle detector 22, work unit angle data indicating an angle of the work unit 2. The work unit angle data includes a boom angle, an arm angle, and a bucket angle. The work unit positional data calculation unit 106 calculates positional data of the boom 6, positional data of the arm 7, and positional data of the bucket 8 in the vehicle body coordinate system on the basis of the work unit angle data acquired from the work unit angle detector 22 and the work unit data stored in the storage unit 109. The positional data of each of the boom 6, arm 7, and bucket 8 include coordinate data, and the pieces of the coordinate data include a plurality of locations of the boom 6, a plurality of locations of the arm 7, and a plurality of locations of the bucket 8 respectively.

Furthermore, the work unit positional data calculation unit 106 calculates positional data of each of the boom 6, the arm 7, and the bucket 8 in the global coordinate system on the basis of the positional data of swing body 3, posture data of the swing body 3, azimuth direction data of the swing body 3, work unit angle data, and the work unit data stored in the storage unit 109.

The work unit data includes design data or specification data of the work unit 2. The design data of the work unit 2 includes three-dimensional CAD data of the work unit 2. The work unit data includes at least one of an external shape data of the work unit 2 and dimensional data of the work unit 2. The work unit data includes a boom length, an arm length, and a bucket length. The boom length is a distance between the rotation axis AX1 and the rotation axis AX2. The arm length is a distance between the rotation axis AX2 and the rotation axis AX3. The bucket length is a distance between the rotation axis AX3 and the blade edge 8BT of the bucket 8.

The map data creation unit 107 creates three-dimensional data DG on the basis of disparity image data SG.

The three-dimensional data DG includes disparity image data SG, three-dimensional data of the vehicle body coordinate system and the like, and three-dimensional map data (elevation map data) described later.

The display control unit 108 causes the display device 26 to display the first image data MR1, second image data ML1, third image data MR2, and fourth image data ML2 acquired by the image data acquisition unit 101.

Additionally, the display control unit 108 causes the display device 26 to display the disparity image data SG generated by the stereo measurement unit 102. Furthermore, the display control unit 108 causes the display device 26 to display the three-dimensional data DG created by the map data creation unit 107.

<Stereo Measurement>

Figure 5:
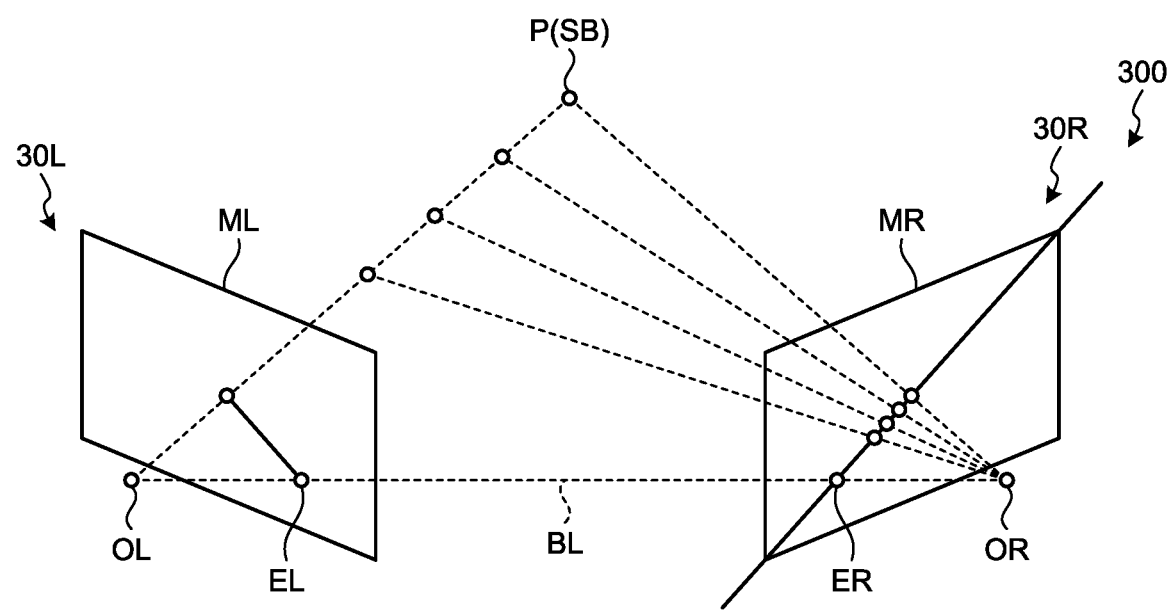
FIG. 5 is a schematic diagram to describe an exemplary stereo measurement method according to the first embodiment.

Next, stereo measurement will be described. FIG. 5 is a schematic diagram to describe an exemplary stereo measurement method according to the present embodiment. In the stereo measurement, image data MR (MR1, MR2) and image data ML (ML1, ML2) acquired by the image data acquisition unit 101 are subjected to stereoscopic image processing to calculate three-dimensional data DG of a photographing subject.

In the following description, one of cameras 30 constituting the stereo camera 300 will be suitably referred to as a first camera 30R (30A, 30C), and the other camera 30 will be suitably referred to as a second camera 30L (30B, 30D). Additionally, in the following description, image data MR photographed by the first camera 30R (30A, 30C) will be suitably referred to as first image data MR (MR1, MR2), and the image data ML photographed by the second camera 30L (30B, 30D) will be suitably referred to as second image data (ML1, ML2). A method of calculating three-dimensional data DG by the first camera 30A and the second camera 30B of the first stereo camera 301 is similar to a method of calculating three-dimensional data DG by the third camera 30C and the fourth camera 30D of the second stereo camera 302.

Meanwhile, in the present embodiment, a right camera 30 is the first camera 30R and a left camera 30 is the second camera 30L, but the left camera 30 may also be the first camera 30R and the right camera 30 may also be the second camera 30L.

Positional data of the first camera 30R and positional data of the second camera 30L are stored in the storage unit 109. The positional data of the first camera 30R includes a position of an optical center OR of the first camera 30R and a direction of an optical axis of an optical system of the first camera 30R. The positional data of the second camera 30L includes a position of an optical center OL of the second camera 30L and a direction of an optical axis of an optical system of the second camera 30L.

Additionally, relative positional data between the first camera 30R and the second camera 30L is stored in the storage unit 109. The relative positional data between the first camera 30R and the second camera 30L includes a dimension of a base line BL connecting the optical center OR of the first camera 30R and the optical center OL of the second camera 30L.

In FIG. 5, an image at a measurement point P of a photographing subject SB existing in a three-dimensional space is projected on a projection plane of the first camera 30R and a projection plane of the second camera 30L, respectively. Additionally, an image at the measurement point P is projected on the projection plane of the first camera 30R, and an image at a point EL is projected on the projection plane of the second camera 30L, thereby defining an epipolar line. Similarly, an image at the measurement point P is projected on the projection plane of the second camera 30L, and an image at a point ER is projected on the projection plane of the first camera 30R, thereby defining an epipolar line. Additionally, an epipolar plane is defined by the measurement point P, point ER, and point EL.

The projection plane of the first camera 30R includes an imaging surface of an image sensor of the first camera 30R. The projection plane of the second camera 30L includes an imaging surface of an image sensor of the second camera 30L.

The image data acquisition unit 101 acquires first image data MR photographed by the first camera 30R and second image data ML photographed by the second camera 30L. Each of the first image data MR photographed by the first camera 30R and the second image data ML photographed by the second camera 30B is two-dimensional image data projected on a projection plane.

The first image data MR and second image data ML acquired by the image data acquisition unit 101 are output to the stereo measurement unit 102. The stereo measurement unit 102 calculates three-dimensional coordinate data at the measurement point P in the camera coordinate system on the basis of: coordinate data of an image at the measurement point P in the first image data MR defined in the camera coordinate system; coordinate data of an image at the measurement point P in the second image data ML; and the epipolar plane.

The stereo measurement unit 102 calculates three-dimensional coordinate data of each of a plurality of measurement points P of a photographing subject SB on the basis of the first image data MR and second image data ML. Thus, the three-dimensional data DG of the photographing subject SB is calculated.

In the present embodiment, after calculating the three-dimensional coordinate data of the plurality of measurement points P in the camera coordinate system by the stereo measurement, the stereo measurement unit 102 calculates three-dimensional coordinate data of a plurality of measurement points P in the vehicle body coordinate system and three-dimensional coordinate data of a plurality of measurement points P in the global coordinate system by applying coordinate conversion.

[Calculation of Distance to Measurement Point]

The stereo measurement unit 102 calculates three-dimensional data DG of a photographing subject SB by applying stereoscopic image processing to the first image data MR and second image data ML. The stereo measurement unit 102 calculates a distance ZP from the base line BL of the stereo camera 300 to a measurement point P of the photographing subject SB on the basis of the principle of triangulation.

Figure 6:
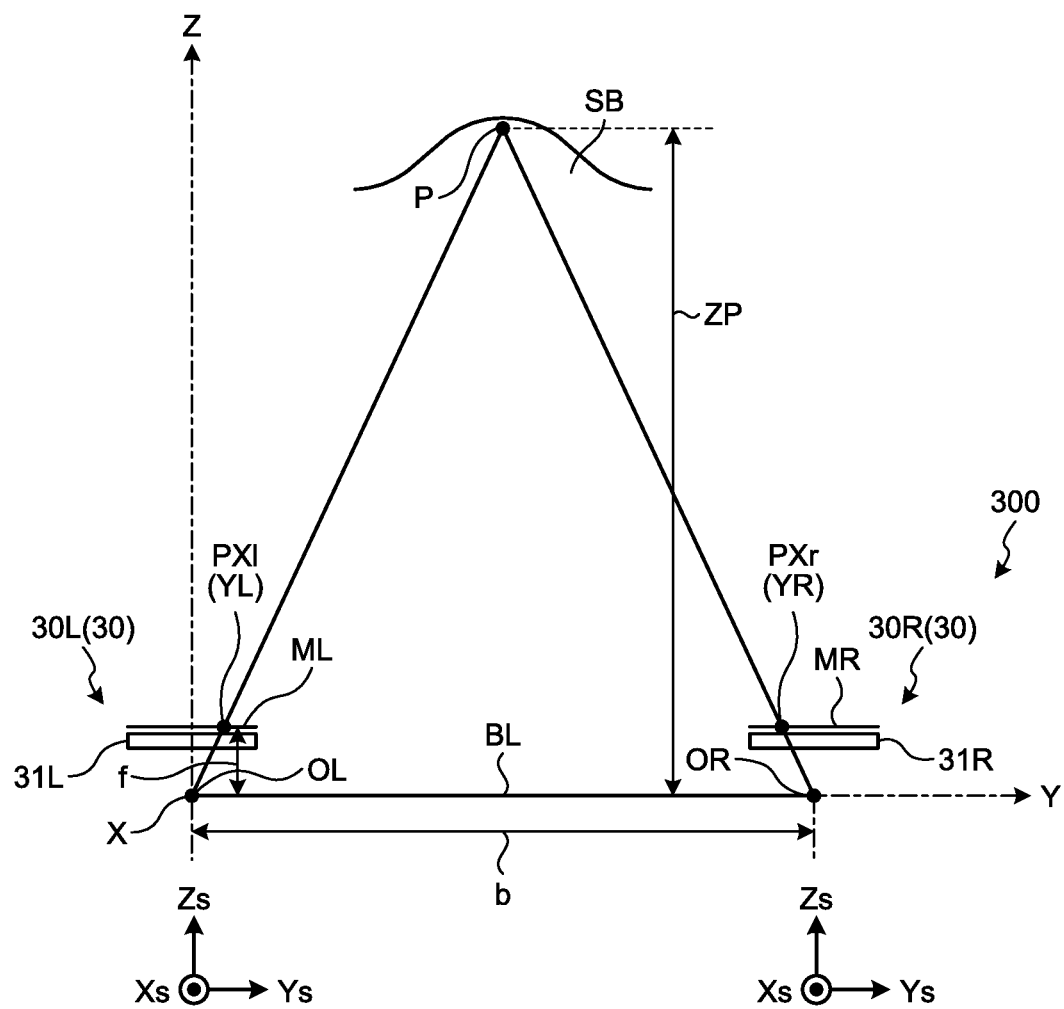
FIG. 6 is a diagram schematically illustrating an exemplary stereo camera according to the first embodiment.

FIG. 6 is a diagram schematically illustrating an exemplary stereo camera 300 according to the present embodiment. As illustrated in FIG. 6, for example, the first camera 30R and the second camera 30L of the stereo camera 300 can be arranged in a direction parallel to the Ys axis of the camera coordinate system. In this case, the Ys axis of the camera coordinate system of the first camera 30R and the Ys axis of the camera coordinate system of the second camera 30L are arranged on a same straight line and directed in the same direction.

The first camera 30R has an image sensor 31R. An origin of the first camera 30R in the camera coordinate system is defined at an optical center OR. An optical axis of an optical system of the first camera 30R is parallel to the Zs axis and passes through the optical center OR. The first image data MR including the photographing subject SB is acquired by the first camera 30R.

The second camera 30L has an image sensor 31L. An origin of the second camera 30L in the camera coordinate system is defined at an optical center OL. An optical axis of an optical system of the second camera 30L is parallel to the Zs axis and passes through the optical center OL. The second image data ML including the photographing subject SB is acquired by the second camera 30L.

In FIG. 6, a three-dimensional coordinate system (X, Y, Z) in which the optical center OL of the second camera 30L is defined as the origin is set. The X axis and the Xs axis are substantially parallel. The Y axis and the Ys axis are substantially parallel. The Z axis and the Zs axis are substantially parallel.

In FIG. 6, the projection plane of the first camera 30R defined on the imaging surface of the image sensor 31R and the projection plane of the second camera 30L defined on the imaging surface of the image sensor 31L are arranged inside the same plane. Also, in the Z axis direction, the projection plane of the first camera 30R and the projection plane of the second camera 30L are arranged at a same position.

The first image data MR includes a projection image of the photographing subject SB formed on the projection plane of the first camera 30R. The second image data ML includes a projection image of the photographing subject SB formed on the projection plane of the second camera 30L.

A dimension of the base line BL is b. A position in the Y axis direction of a pixel PXr including the measurement point P in the first image data MR photographed by the first camera 30R is YR. A position in the Y axis direction of a pixel PX1 including the measurement point P in the second image data ML photographed the second camera 30B is YL. A distance in the Z axis direction between the projection plane of the second camera 30L and the base line BL is f. Note that the distance f is equal to a focal distance of the optical system of the second camera 30L.

A disparity indicating a distance between a projection point of the measurement point P in the first image data MR and a projection point of the measurement point P in the second image data ML is d. The disparity d may be a deviation amount (unit: pixel) between the pixel PXr including the measurement point P and the pixel PX1 including the measurement point P, or may be a distance between the pixel PXr including the measurement point P, the pixel PX1 including the measurement point P, and the pixel PXr.

The distance ZP from the base line BL of the stereo camera 300 to the measurement point P of the photographing subject SB is calculated on the basis of Equation (1).

$$ZP = \frac{bf}{d} \quad (1)$$

[Disparity Image Data]

Figure 7:
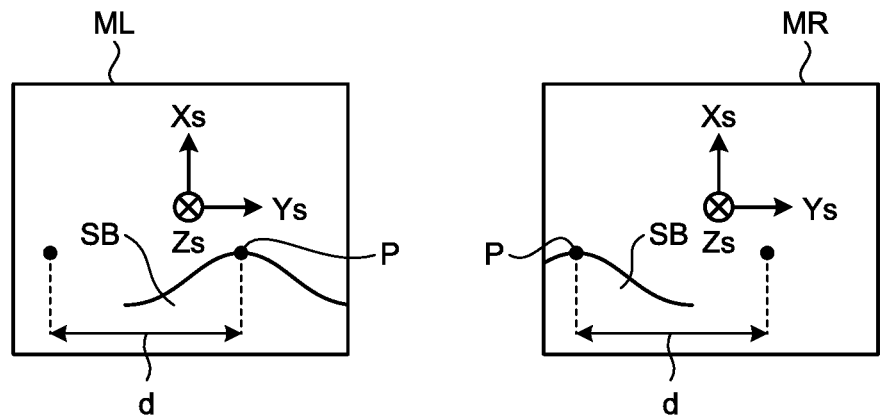
FIG. 7 is a diagram schematically illustrating examples of first image data photographed by a first camera and second image data photographed by a second camera according to the first embodiment.
Figure 8:
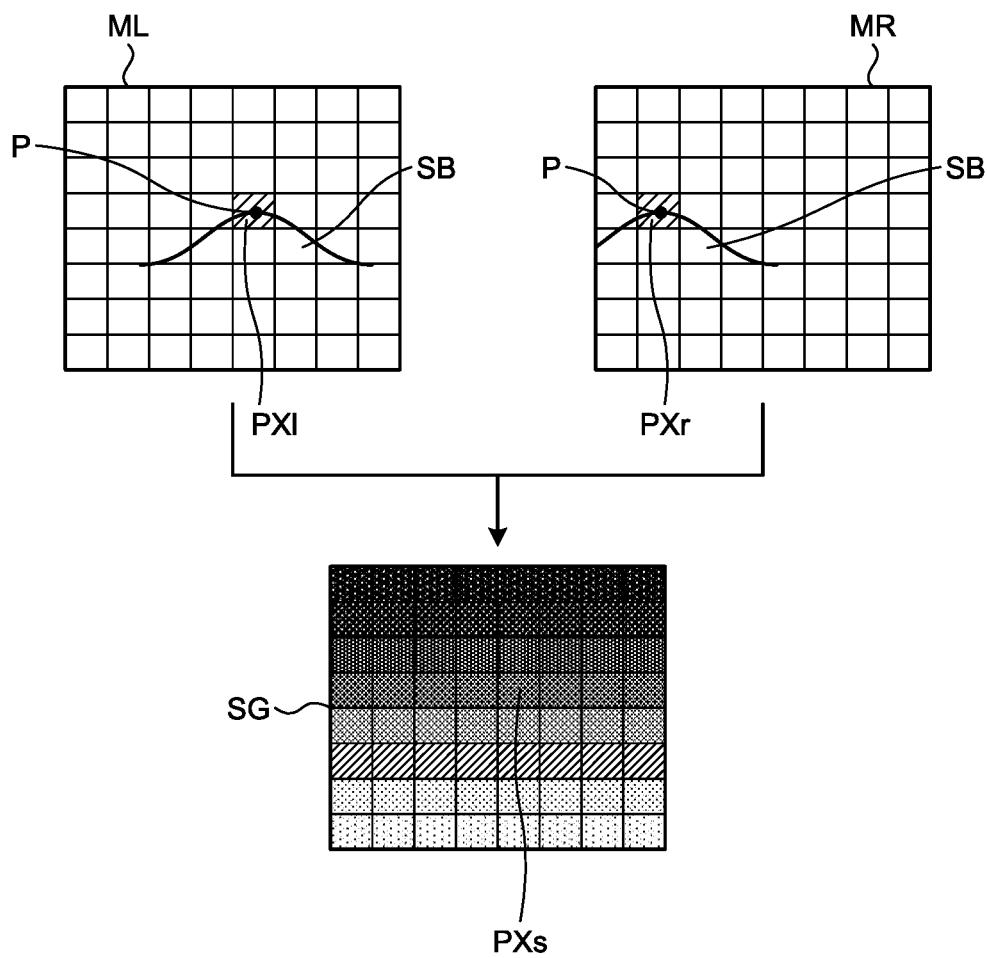
FIG. 8 is a diagram schematically illustrating examples of first image data photographed by the first camera and second image data photographed by the second camera according to the first embodiment.

FIGS. 7 and 8 are diagrams schematically illustrating examples of first image data MR photographed by the first camera 30R and second image data ML photographed by the second camera 30L according to the present embodiment.

As illustrated in FIGS. 7 and 8, a position of the measurement point P in the first image data MR differs from a position of the measurement point P in the second image data ML are different in the Ys axis direction due to the disparity d indicating the distance between the projection point of the measurement point P in the first image data MR and the projection point of the measurement point P in the second image data ML. As illustrated in FIG. 7, a disparity d represents a deviation amount in the Ys axis direction between the projection point (pixel) of the measurement point P in the first image data MR and the projection point (pixel) of the measurement point P in the second image data ML.

The stereo measurement unit 102 applies stereoscopic image processing to the first image data MR and the second image data ML to generate disparity image data SG of the photographing subject SB. Specifically, the stereo measurement unit 102 executes stereo correspondence search on the first image data MR and the second image data ML. The stereo correspondence search represents processing to search the first image data MR and the second image data ML respectively for a pixel PXr and a pixel PX1 where the same measurement point P is projected.

The stereo measurement unit 102 uses the first image data MR as base image data and the second image data ML as referential image data. As illustrated in FIG. 8, the stereo measurement unit 102 searches the second image data ML for a pixel PX1 including a same projection point of the measurement point P with respect to the pixel PXr including a projection point of the measurement point P in the first image data MR. In the present embodiment, the stereo measurement unit 102 searches a plurality of pixels PX1 existing on the epipolar line of the second image data ML for the pixel PM1 including the projection point of the measurement point P.

Note that the pixels PXr and PX1 used for the stereo correspondence search may be one pixel or a set of a plurality of pixels of the image sensor.

In the following description, the pixel PXr including the projection point of the measurement point P in the first image data MR will be suitably referred to as a focused pixel PXr, and the pixel PX1 including the projection point of the same measurement point P in the second image data ML will be suitably referred to as a corresponding pixel PX1.

Additionally, in the following description, a state in which search for the corresponding pixel PX1 has been successfully performed as a result of the search for the corresponding pixel PX1 with respect to the focused pixel PXr will be suitably referred to as successful search. Additionally, a state in which the search for the corresponding pixel PX1 has failed as a result of the search for the corresponding pixel PX1 with respect to the focused pixel PXr will be suitably referred to as failed search.

At the time of successful search, the stereo measurement unit 102 can obtain a disparity d (e.g., number of deviated pixels) on the basis of a distance between the focused pixel PXr and the corresponding pixel PX1. In Equation (1), the dimension b of the base line BL and the focal distance f are known data derived from the design data or specification data of the camera 30, and stored in the storage unit 109. Therefore, when the search has been successfully performed and the disparity d is calculated, the stereo measurement unit 102 can calculate the distance ZP to the measurement point P on the basis of the dimension b and focal distance f stored in the storage unit 109 and the calculated disparity d.

On the other hand, at the time of failed search, the stereo measurement unit 102 cannot calculate a disparity d and cannot calculate the distance ZP to the measurement point P.

At the time of successful search, the stereo measurement unit 102 generates a pixel PXs on the basis of the focused pixel PXr and the corresponding pixel PX1 for which search has been successful. On the other hand, at the time of failed search, the stereo measurement unit 102 generates a pixel PXs on the basis of the focused pixel PXr and the corresponding pixel PX1 for which search has failed.

The stereo measurement unit 102 executes stereo correspondence search on each of the plurality of pixels PXr of the first image data MR. Consequently, a plurality of pixels PXs is generated, and disparity image data SG in which the plurality of pixels PXs is two-dimensionally arranged is generated. The disparity image data SG is image data in which magnitude of a disparity in each pixel PXs calculated by the stereo measurement unit 102 is visualized, and for example, respective pixels are expressed in gradations of gray color in accordance with the magnitude of disparity as illustrated in FIG. 8 (in a case of having a large disparity, a pixel is expressed in white, and in a case of having a small disparity, a pixel is expressed in black). The disparity image data SG may be expressed by a method other than the gradations and may also be expressed by a color varied in accordance with the magnitude of disparity, for example.

The stereo measurement unit 102 may provide success data indicating a fact that the search has been successfully performed to a pixel PXs generated on the basis of the focused pixel PXr and corresponding pixel PX1 for which the search has been successful, and may provide failure data indicating a fact that search has failed to the pixel PXs generated on the basis of the focused pixel PXr and corresponding pixel PX1 for which the search has failed. Since the failure data is provided to the pixel PXs, the pixel PXs is displayed in black, for example.

In the following description, a pixel PXs generated on the basis of a focused pixel PXr and a corresponding pixel PX1 for which search has been successfully performed will be simply referred to as a search successful pixel PXs, and a pixel PXs generated on the basis of a focused pixel PXr and a corresponding pixel PX1 for which the search has failed will be simply referred to as a search failed pixel PXs.

The stereo measurement unit 102 can generate disparity image by expressing each of a plurality of search successful pixels PXs on the basis of the disparity d. Additionally, the stereo measurement unit 102 can generate a range image by expressing each of the plurality of search successful pixels PXs on the basis of the distance ZP. The range image may be image data in which a distance ZP from a camera 30 to a target point P is stored in each of pixels PXs of image data in a some kind of form, or may be an image in which the distance ZP from the camera 30 to the target point P in each of the pixel PXs is visibly expressed. The disparity image data SG includes range image data.

[Stereo Ratio]

Next, a stereo ratio will be described. The stereo ratio is, for example, a ratio of pixels PXs in which the stereo measurement has been successfully performed among a plurality of pixels PXs of disparity image data SG generated by the stereo measurement unit 102. The pixel PXs in which the stereo measurement has been successfully performed represents a pixel PXs generated on the basis of a focused pixel PXr and a corresponding pixel PX1 for which the search for a corresponding pixel PX1 has been successfully performed as a result of performing stereo correspondence retrieving with respect to the focused pixel PXr.

The stereo ratio STR is represented by Equation (2) below.

$$STR = \frac{PXS}{PXA} \quad (2)$$

In Equation (2), PXA represents the total number of pixels PXs of the disparity image data SG. PXS represents the total number of pixels PXs in which stereo measurement has been successfully performed in the disparity image data SG.

Meanwhile, a pixels PXs obtained by excluding a pixel PXs corresponding to a region having no pattern from all of the pixels PXs of the disparity image data SG may be set as a denominator in Equation (2).

Note that the stereo ratio STR may be the total number of pixels PXs in which stereo measurement has been successfully performed in the disparity image data SG.

[Parameter]

Next, the parameters stored in the storage unit 109 and defining a relative position between the first camera 30R and the second camera 30L will be described. In the following description, it is assumed that the first camera 30R is a base camera and the second camera 30L is a referenced camera.

Figure 9:
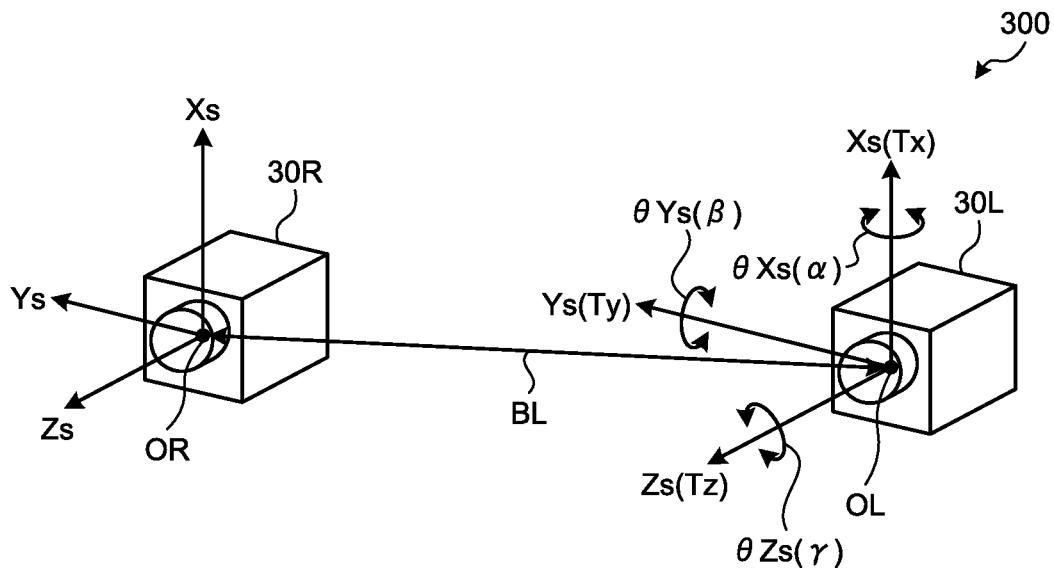
FIG. 9 is a schematic view to describe a relative position between the first camera and the second camera according to the first embodiment.

FIG. 9 is a schematic view to describe a relative position between the first camera 30R and the second camera 30L of the stereo camera 300 according to the present embodiment. As illustrated in FIG. 9, the first camera 30R and the second camera 30L may be arranged in a direction parallel to the Ys axis, for example.

In the present embodiment, the plurality of parameters related to the first camera 30R and the second camera 30L are preliminarily obtained and stored in the storage unit 109. In the present embodiment, the storage unit 109 stores a plurality of external parameters that defines a relative position between the first camera 30R and the second camera 30L.

The external parameters include parameters $\alpha$, $\beta$, $\gamma$ of rotational directions of the second camera 30L relative to the first camera 30R and parameters Tx, Ty, Tz of translational directions of the second camera 30L relative to the first camera 30R.

The parameter $\alpha$ represents a relative angle of an optical axis of the optical system of the second camera 30L in the $\theta Xs$ direction with respect to the first camera 30R. The parameter $\beta$ represents a relative angle of the optical axis of the optical system of the second camera 30L in the $\theta Ys$ direction with respect to the first camera 30R. The parameter $\gamma$ represents a relative angle of the optical axis of the optical system of the second camera 30L in the $\theta Zs$ direction with respect to the first camera 30R.

In the following description, the parameter $\alpha$ will be suitably referred to as a yaw angle $\alpha$, the parameter $\beta$ suitably as a pitch angle $\beta$, and the parameter $\gamma$ suitably as a roll angle $\gamma$.

The parameter Tx represents a relative position in the Xs axis direction of the second camera 30L with respect to the first camera 30R. The parameter Ty represents a relative position in the Ys axis direction of the second camera 30L with respect to the first camera 30R. The parameter Tz represents a relative position in the Zs axis direction of the second camera 30L with respect to the first camera 30R.

In the following description, the parameter Tx will be suitably referred to as a shift amount Tx, the parameter Ty suitably as a shift amount Ty, and the parameter Tz suitably as a shift amount Tz.

In the present embodiment, the storage unit 109 stores the yaw angle α, pitch angle β, roll angle γ, shift amount Tx, shift amount Ty, and shift amount Tz as external parameters.

The relative position between the first camera 30R and the second camera 30L is defined by Equation (3) below including the above-described plurality of external parameters.

$$\begin{pmatrix} x_1 \\ y_1 \\ z_1 \end{pmatrix} = \begin{pmatrix} 1 & 0 & 0 \\ 0 & \cos\alpha & \sin\alpha \\ 0 & -\sin\alpha & \cos\alpha \end{pmatrix} \begin{pmatrix} \cos\beta & 0 & -\sin\beta \\ 0 & 1 & 0 \\ \sin\beta & 0 & \cos\beta \end{pmatrix} \begin{pmatrix} \cos\gamma & \sin\gamma & 0 \\ -\sin\gamma & \cos\gamma & 0 \\ 0 & 0 & 1 \end{pmatrix} \begin{pmatrix} x_2 \\ y_2 \\ z_2 \end{pmatrix} + \begin{pmatrix} T_x \\ T_y \\ T_z \end{pmatrix} \quad (3)$$

In Equation (3), $(x_1, y_1, z_1)$ represents coordinates of the first camera 30R in the camera coordinate system of the first camera 30R. $(x_2, y_2, z_2)$ represents coordinates of the second camera 30L in the camera coordinate system of the second camera 30L.

Equation (3) includes three rotation matrices respectively defined by the yaw angle α, pitch angle β, and roll angle γ, and parallel translation vectors defined by the shift amount Tx, shift amount Ty, and shift amount Tz. Equation (3) is a conversion equation to convert a position of the second camera 30L in the camera coordinate system of the second camera 30L into a position in the camera coordinate system of the first camera 30R.

In the present embodiment, a relative position between the first camera 30R and the second camera 30L is defined on the basis of Equation (3). The first adjustment unit 103 and the second adjustment unit 104 can adjust the relative position between the first camera 30R and the second camera 30L in the camera coordinate system of the first camera 30R by adjusting at least one of the yaw angle α, pitch angle β, roll angle γ, shift amount Tx, shift amount Ty, and shift amount Tz.

At the time of factory shipment of the excavator 1, the yaw angle α, pitch angle β, roll angle γ, shift amount Tx, shift amount Ty, and shift amount Tz of the second camera 30L with respect to the first camera 30R are adjusted such that a stereo ratio becomes a stereo threshold or more. The stereo threshold is a threshold defined for the stereo ratio. In the following description, adjusting the relative position between the first camera 30R and the second camera 30L such that the stereo ratio becomes the stereo threshold or more will be suitably referred to as external calibration processing.

The conversion equation including the yaw angle α, pitch angle β, roll angle γ, shift amount Tx, shift amount Ty, and shift amount Tz derived in the external calibration processing is stored in the storage unit 109 at the time of factory shipment of the excavator 1.

The stereo measurement unit 102 generates disparity image data SG by applying stereoscopic image processing to the first image data MR and second image data ML by using the parameters stored in the storage unit 109.

There may be a possibility that a camera 30 is physically moved due to an external factor such as vibration, impact, or heat after factory shipment of the excavator 1 mounted with the stereo camera 300 subjected to the external calibration processing. For example, a position of one camera 30 out of the first camera 30R and the second camera 30L may be displaced in at least one of the Xs axis direction, Ys axis direction, Zs axis direction, θXs direction, θYs direction, and the θZs direction with respect to the other camera 30 due to an external factor.

In a case where a relative position between the first camera 30R and the second camera 30L is physically changed, a difference may cause between a relative position between the first camera 30R and the second camera 30L defined by the external parameters stored in the storage unit 109 at the time of factory shipment and a relative position between the actual first camera 30R and the second camera 30L after the camera 30 is moved. In this case, even in a case of searching the first image data MR and the second image data ML for a corresponding point by stereo measurement, the search may fail with high possibility. As a result, a stereo ratio is degraded and it becomes difficult to accurately execute the stereo measurement for a photographing subject SB.

In the present embodiment, in a case where the position of at least one camera 30 out of the first camera 30R and the second camera 30L is displaced and the stereo ratio is degraded, the first adjustment unit 103 changes at least a part of the plurality of external parameters included in Equation (3) so as to improve the stereo ratio. Additionally, in a case where the position of at least one camera 30 out of the first camera 30R and the second camera 30L is displaced and a reduction scale of a measurement result by the stereo camera 300 (distance or scale from the camera 30 to a measurement point P) becomes inaccurate, the second adjustment unit 104 change at least a part of the plurality of external parameters included in Equation (3) to adjust the scale of three-dimensional data DG.

In other words, in the present embodiment, in a case where the position of the camera 30 is physically moved, the control device 100 changes an external parameter stored in the storage unit 109 and automatically corrects the relative position between the first camera 30R and the second camera 30L by the arithmetic processing.

[Stereo Ratio Adjustment]

Next, stereo ratio adjustment according to the present embodiment will be described. The first adjustment unit 103 adjusts an external parameter to execute stereo ratio adjustment processing.

The display control unit 108 causes the display device 26 to display disparity image data SG generated by the stereo measurement unit 102. The stereo measurement unit 102 provides a search successful pixel PXs with success data in order to display the pixel in gray, and provides a search failed pixel PXs with failure data in order to display the pixel in black.

Figure 10:
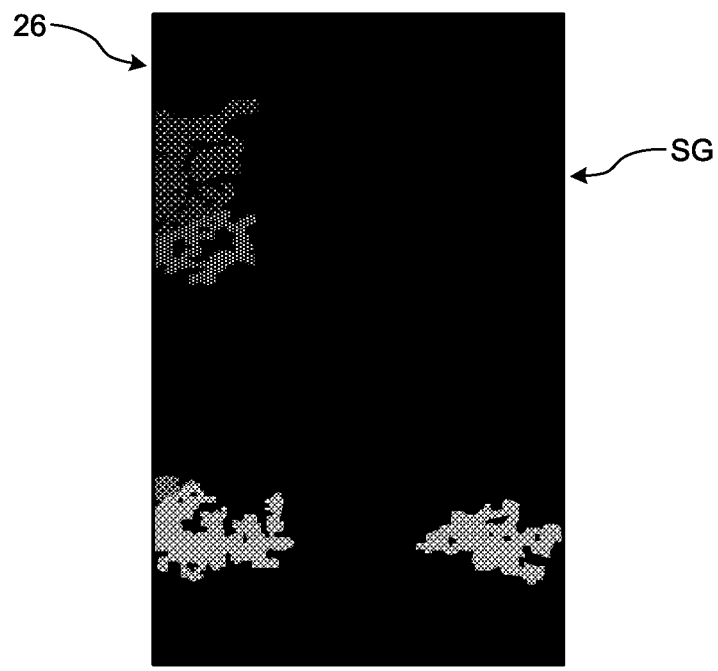
FIG. 10 is a view schematically illustrating exemplary disparity image data at the time of failed search according to the first embodiment.

FIG. 10 is a view schematically illustrating exemplary disparity image data SG at the time of failed search according to the present embodiment. In the case where a relative position between the first camera 30R and the second camera 30L of the stereo camera 300 is physically changed, the search fails with high possibility even though stereo correspondence search is executed on the first image data MR and the second image data ML. As a result, as illustrated in FIG. 10, the stereo ratio is degraded, and most of pixels PXs of disparity image data SG are displayed in black.

Figure 11:
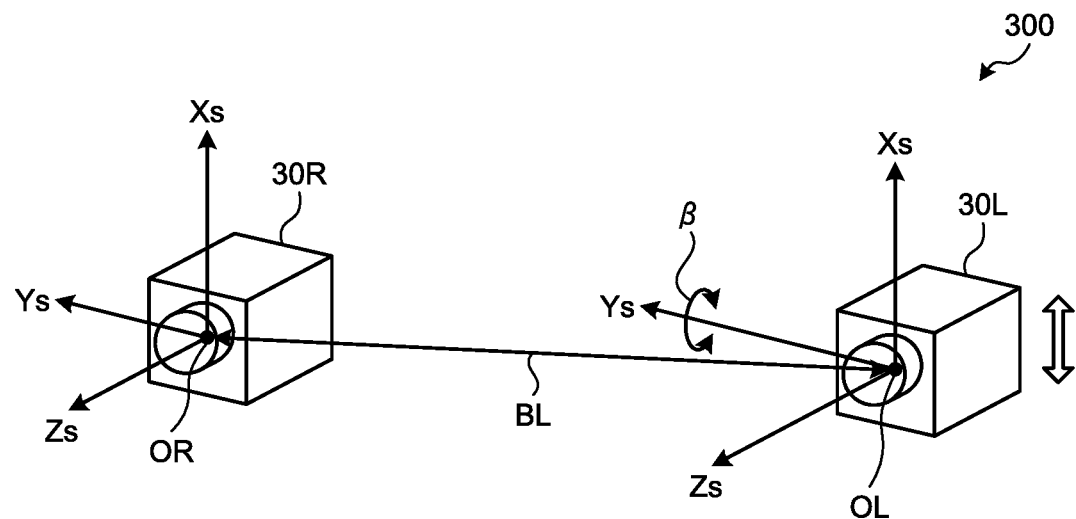
FIG. 11 is a schematic view to describe exemplary stereo ratio adjustment processing by a first adjustment unit according to the first embodiment.

FIG. 11 is a schematic view to describe exemplary stereo ratio adjustment processing by the first adjustment unit 103 according to the present embodiment. When the stereo ratio is degraded, the first adjustment unit 103 changes, for example, the pitch angle β among the plurality of external parameters stored in the storage unit 109. As illustrated in FIG. 11, since the pitch angle β of an external parameter is adjusted, the second camera 30L is pseudo-rotated in the θYs direction.

As described above, in the stereo correspondence search, the stereo measurement unit 102 searches a plurality of pixels PX1 existing on the epipolar line of the second image data ML for a pixel PX1 including a projection point of a measurement point P. In the present embodiment, the first camera 30R and the second camera 30L are arranged in the Ys axis direction, and the epipolar line extends in the Ys axis direction. In a case where the first camera 30R and the second camera 30L are arranged in the Ys axis direction, whether search in the stereoscopic processing is successfully performed is largely influenced by a deviation of the pitch angle β. Therefore, the first adjustment unit 103 can search the plurality of pixels PX1 on the epipolar line on which a corresponding pixel PX1 including the measurement point P exists with high possibility can be searched by changing the pitch angle β of the external parameter.

The first adjustment unit 103 adjusts the pitch angle β so as to improve a stereo ratio of disparity image data SG. In the present embodiment, the storage unit 109 stores a reference pitch angle $\beta_0$. The reference pitch angle $\beta_0$ is a pitch angle β adjusted in the external calibration processing at the time of factory shipment such that the stereo ratio becomes maximal, or equal to or more than the stereo threshold. The first adjustment unit 103 calculates, for example, a maximum value of the stereo ratio by changing the pitch angle β of the second camera 30L in a predetermined range including the reference pitch angle $\beta_0$.

Figure 12:
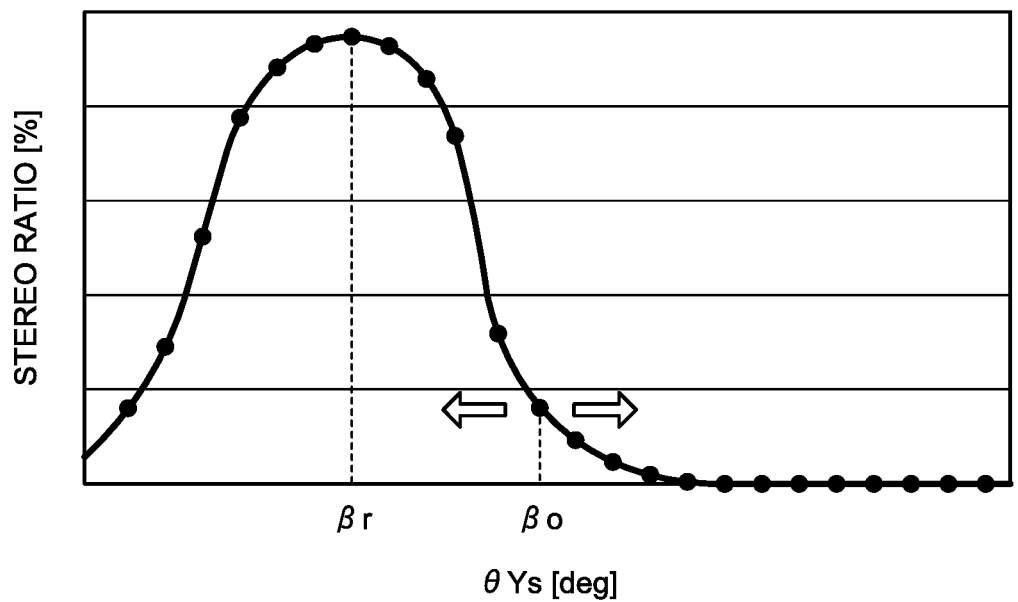
FIG. 12 is a schematic graph to describe an exemplary stereo ratio adjustment method by the first adjustment unit according to the first embodiment.

FIG. 12 is a schematic graph to describe an exemplary stereo ratio adjustment method by the first adjustment unit 103 according to the present embodiment. In the graph illustrated in FIG. 12, a horizontal axis represents the pitch angle β of the external parameter, and a vertical axis represents the stereo ratio.

The first adjustment unit 103 changes the pitch angle β by an increment of a predetermined angle in a predetermined range in a plus direction and a minus direction while setting the reference pitch angle $\beta_0$ as a reference. Every time the pitch angle β is changed, the stereo measurement unit 102 calculates the stereo ratio. As illustrated in FIG. 12, the stereo ratio is changed in accordance with change of the pitch angle β. For example, the first adjustment unit 103 determines, as a correct pitch angle βr, a pitch angle β at the time of obtaining the maximum value of the stereo ratio in the predetermined range.

Note that a method of determining the correct pitch angle βr is not limited to the method described above. As far as the pitch angle β provides the stereo ratio equal to or more than the stereo threshold, an arbitrary pitch angle β may be set as the correct pitch angle βr.

Figure 13:
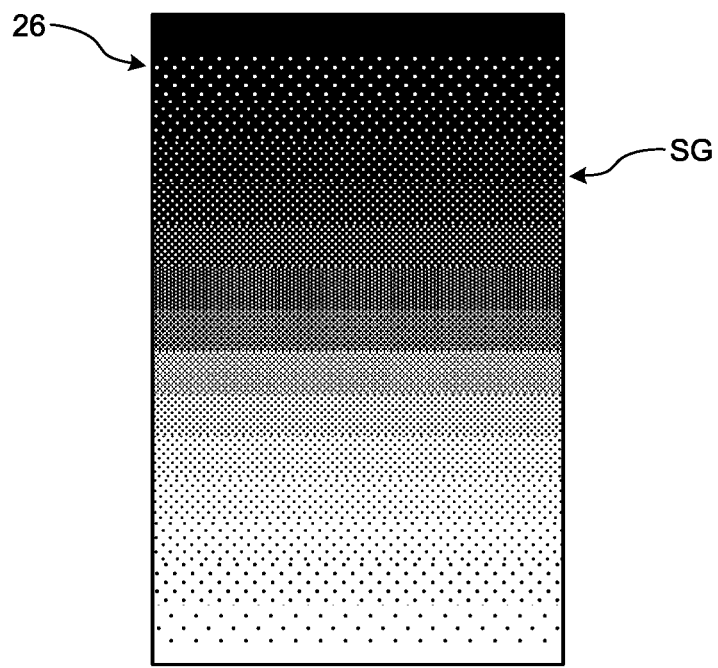
FIG. 13 is a view schematically illustrating exemplary disparity image data at the time of successful search according to the first embodiment.

FIG. 13 is a view schematically illustrating exemplary disparity image data SG at the time of successful search according to the present embodiment. The first adjustment unit 103 changes the pitch angle β (reference pitch angle $\beta_0$) stored in the storage unit 109 to the correct pitch angle βr. In other words, the pitch angle β of the rotation matrix of Equation (3) is changed from the reference pitch angle $\beta_0$ to the correct pitch angle βr. The stereo measurement unit 102 generates the disparity image data SG by executing stereo measurement on the basis of first image data MR, second image data ML, and external parameters including the correct pitch angle βr. Since the pitch angle β is changed from the reference pitch angle $\beta_0$ to the correct pitch angle βr, the external parameters stored in the storage unit 109 are optimized for the first camera 30R and the second camera 30L after the relative position therebetween is physically changed. Therefore, there is high possibility that search is successful when the stereo measurement unit 102 executes stereo correspondence search by using the first image data MR and the second image data ML after the relative position between the first camera 30R and the second camera 30L of the stereo camera 300 is physically changed. Consequently, as illustrated in FIG. 13, the stereo ratio is improved, and most of pixels PXs of the disparity image data SG are displayed in gray.

[Scale Adjustment]

Next, stereo ratio adjustment according to the present embodiment will be described. The second adjustment unit 104 adjusts a scale of three-dimensional data DG by adjusting an external parameter.

The stereo ratio adjustment is processing to improve a stereo ratio by changing an external parameter to pseud-adjust a position of a camera 30 that has been physically changed. However, a scale difference between an actual topography and three-dimensional data DG measured by the stereo camera 300 is still large only by improving the stereo ratio, and sufficient measurement accuracy cannot be obtained. Therefore, in the present embodiment, scale adjustment is executed for the three-dimensional data DG having the stereo ratio improved by the above-described method. The scale adjustment is processing to grasp how far from the stereo camera 300 the three-dimensional data DG exist and adjust the three-dimensional data so as to conform to the actual topography. With this scale adjustment, it is possible to obtain three-dimensional data DG conforming to the actual topography and having high accuracy with little error.

Figure 14:
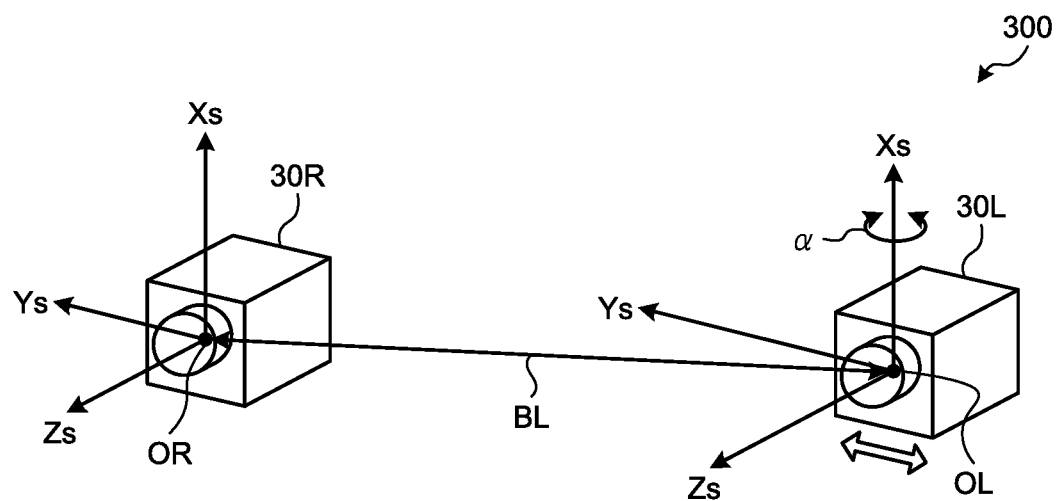
FIG. 14 is a schematic view to describe exemplary scale adjustment processing by a second adjustment unit according to the first embodiment.

FIG. 14 is a schematic view to describe exemplary scale adjustment processing by the second adjustment unit 104 according to the present embodiment. When the scale of the three-dimensional data DG is adjusted, the second adjustment unit 104 changes, for example, the yaw angle α among the plurality of external parameters stored in the storage unit 109. As illustrated in FIG. 14, since the yaw angle α of the external parameter is adjusted, the second camera 30L is pseudo-rotated in the θXs direction.

In the present embodiment, the first camera 30R and the second camera 30L are arranged in the Ys axis direction, and a distance ZP to a measurement point P is calculated on the basis of the principle of triangulation. Therefore, since the yaw angle α of the external parameter of the second camera 30L is changed, the second adjustment unit 104 can adjust a disparity of a pixel in which the measurement point P is projected in the disparity image data SG. Since the disparity in the disparity image data SG is adjusted, the scale of the three-dimensional data DG is indirectly adjusted.

The second adjustment unit 104 changes the yaw angle α of the external parameter defined for the stereo camera 300 so as to reduce a difference between a reference scale described later and a scale of three-dimensional data DG obtained from disparity image data SG. The reference scale is a reference scale used to adjust a reduction scale from a camera 30 to a measurement point P (distance or scale) such that the three-dimensional data DG obtained from the disparity image data SG conforms to an actual topography. The second adjustment unit 104 determines a correct yaw angle αr at which the difference between the reference scale and the scale of the three-dimensional data DG becomes minimal or equal to or less than a threshold.

In the present embodiment, the storage unit 109 stores a reference yaw angle $α_0$. The reference yaw angle $α_0$ is a yaw angle α obtained by adjusting disparity image data in the external calibration processing at the time of factory shipment. The second adjustment unit 104 calculates a minimum value of the difference between the reference scale and the scale of the three-dimensional data DG by changing the yaw angle α of the second camera 30L in a predetermined range including the reference yaw angle $α_0$.

The second adjustment unit 104 changes the yaw angle α (reference yaw angle $α_0$) stored in the storage unit 109 to the correct yaw angle αr. In other words, the yaw angle α of the rotation matrix in Equation (3) is changed from the reference yaw angle $α_0$ to the correct yaw angle αr. The stereo measurement unit 102 generates disparity image data SG by executing stereo measurement on the basis of the first image data MR, second image data ML, and external parameters including the correct yaw angle αr. Since the yaw angle α is changed from the reference yaw angle $α_0$ to the correct yaw angle αr, after a relative position between the first camera 30R and the second camera 30L is physically changed, the external parameter stored in the storage unit 109 is optimized for the first camera 30R and the second camera 30L after the relative position therebetween is physically changed. Therefore, after the relative position between the first camera 30R and the second camera 30L of the stereo camera 300 is physically changed, the scale of the three-dimensional data DG becomes a scale similar to an actual construction site. In other words, the three-dimensional data DG comes to have a shape similar to a shape of the actual construction site.

[Shape Measurement Method]

Figure 15:
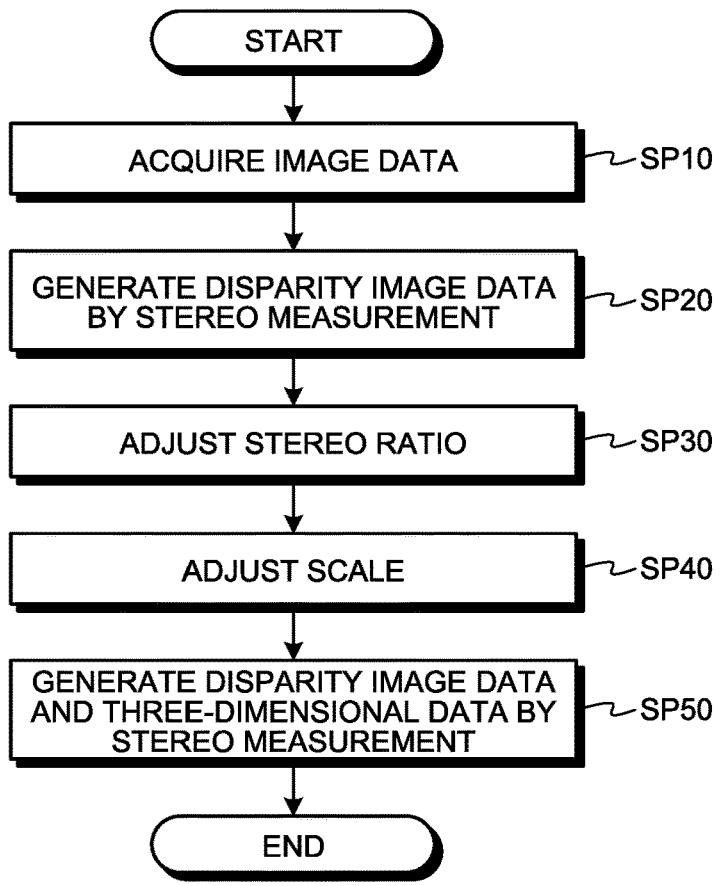
FIG. 15 is a flowchart illustrating an exemplary position measurement method according to the first embodiment.

Next, a position measurement method according to the present embodiment will be described. FIG. 15 is a flowchart illustrating an exemplary position measurement method according to the present embodiment.

The first stereo camera 301 provided at the excavator 1 photographs a distant view region that is a first region of a photographing subject SB. The second stereo camera 302 provided in the excavator 1 photographs a near view region that is a second region of the photographing subject SB.

The image data acquisition unit 101 acquires: first image data MR1 and second image data ML1 photographed by the first camera 30A and the second camera 30B of the first stereo camera 301; and third image data MR2 and fourth image data ML2 photographed by the third camera 30C and the fourth camera 30D of the second stereo camera 302 (Step SP10).

Each of the first image data MR1 and second image data ML1 photographed by the first stereo camera 301 includes a distant view region of a photographing subject SB. Each of the third image data MR2 and fourth image data ML2 photographed by the second stereo camera 302 includes a near view region of the photographing subject SB.

The stereo measurement unit 102 executes stereo measurement on the basis of the first image data MR1 and second image data ML1 photographed by the first stereo camera 301 and the plurality of parameters stored in the storage unit 109. The stereo measurement unit 102 executes the stereo measurement to generate first disparity image data SG1 indicating the distant view region of the photographing subject SB.

Additionally, the stereo measurement unit 102 executes stereo measurement on the basis of the third image data MR2 and fourth image data ML2 photographed by the second stereo camera 302 and the plurality of parameters stored in the storage unit 109. The stereo measurement unit 102 executes the stereo measurement to generate second disparity image data SG2 indicating the near view region of the photographing subject SB (Step SP20).

Figure 16:
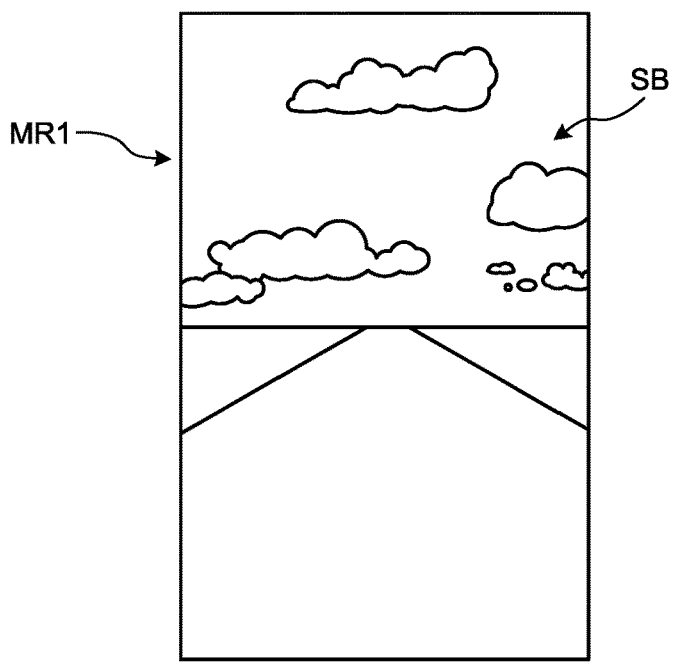
FIG. 16 is a view schematically illustrating an exemplary photographing subject according to the first embodiment.

FIG. 16 is a view schematically illustrating the first image data MR1 obtained by the first camera 30A photographing the photographing subject SB according to the present embodiment. As illustrated in FIG. 16, the first stereo camera 301 photographs the distant view region of the photographing subject SB. The distant view region of the photographing subject SB includes not only the ground that is a construction object but also an object such as sky or a cloud in the sky located at an infinite point with respect to the first stereo camera 301.

Figure 17:
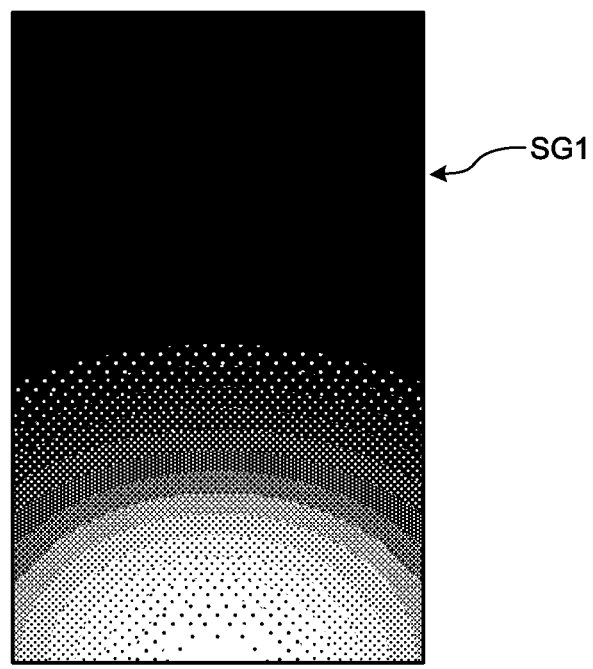
FIG. 17 is a view schematically illustrating exemplary disparity image data generated on the basis of first image data and second image data acquired by a first stereo camera according to the first embodiment.

FIG. 17 is a view schematically illustrating an exemplary first disparity image data SG1 generated on the basis of the first image data MR1 and second image data ML1 acquired by the first stereo camera 301 according to the present embodiment. Meanwhile, in FIG. 17, a disparity d between the first image data MR1 and the second image data ML1 of an object included in the photographing subject SB and existing at an infinite point with respect to the first stereo camera 301 is zero. Therefore, a portion included in the first disparity image data SG1 and corresponding to the sky and clouds are displayed in black.

In the present embodiment, for example, the external calibration processing for the first stereo camera 301 and second stereo camera 302 is executed at the factory shipment. In the following description, as for the second stereo camera 302, it is assumed that: stereo correspondence search on third image data MR2 and fourth image data ML2 acquired by the second stereo camera 302 has been successfully performed; and second disparity image data SG2 has a stereo ratio equal to or more than the stereo threshold. In contrast, as for the first stereo camera 301, it is assumed that: at least one of the first camera 30A and the second camera 30B is displaced after the external calibration processing; stereo correspondence search on first image data MR1 and second image data ML1 acquired by the first stereo camera 301 has failed; and first disparity image data SG1 has a stereo ratio smaller than the stereo threshold. When the stereo correspondence search has failed in most of pixels of the first disparity image data SG1, most parts of the disparity image are displayed as black regions as illustrated in FIG. 10, for example.

The first adjustment unit 103 adjusts the stereo ratio of the first disparity image data SG1 by changing at least a part of parameters among the plurality of parameters defined for the first stereo camera 301, and improves the stereo ratio (Step SP30).

In the present embodiment, adjusting the stereo ratio includes changing the pitch angle β. The first adjustment unit 103 changes the pitch angle β of an external parameter defined for the first stereo camera 301 by the above-described method so as to improve the stereo ratio of the first disparity image data SG1 in which the search has failed in most parts. The first adjustment unit 103 determines the correct pitch angle βr at which the stereo ratio becomes maximal or equal to or more than the stereo threshold value.

The stereo measurement unit 102 performs stereo measurement for the first image data MR1 and the second image data ML1 by using the correct pitch angle βr. Consequently, first disparity image data SG1 having the stereo ratio improved is generated like the disparity image illustrated in FIG. 13, for example.

Next, the second adjustment unit 104 uses the correct pitch angle βr for the first stereo camera 301 to adjust a scale of first three-dimensional data DG10 obtained from the first disparity image data SG1 having the stereo ratio that is maximal or equal to or more than the threshold (Step SP40).

In the present embodiment, adjusting the scale includes adjusting the yaw angle α. The second adjustment unit 104 changes the yaw angle α of the external parameter defined for the first stereo camera 301 so as to reduce a difference between the reference scale and the scale of the first three-dimensional data DG1. The second adjustment unit 104 determines the correct yaw angle αr at which the difference between the reference scale and the scale of the first three-dimensional data DG1 becomes minimal or equal to or less than the threshold value.

In the present embodiment, the reference scale includes a scale of second three-dimensional data DG2 obtained from the second disparity image data SG2 generated on the basis of the third image data MR2 and fourth image data ML2 acquired from the second stereo camera 302. The second adjustment unit 104 changes the yaw angle α (reference yaw angle $α_0$) of the external parameter stored in the storage unit 109 so as to reduce a difference between the scale of the second three-dimensional data DG2 generated on the basis of the third image data MR2 and fourth image data ML2 photographed by the second stereo camera 302 and the scale of the first three-dimensional data DG1 generated on the basis of the first image data MR1 and second image data ML1 photographed by the first stereo camera 301.

As described above, in the present embodiment, the stereo ratio of the second disparity image data SG2 is the stereo threshold or more. Therefore, it can be deemed that the relative position between the third camera 30C and the fourth camera 30D of the second stereo camera 302 has not been changed from the time of factory shipment. In the external calibration processing at the time of factory shipment, not only stereo ratio adjustment but also scale adjustment are executed. In other words, in the external calibration processing, the relative positions between a pair of cameras 30 of the stereo camera 300 is adjusted such that a stereo ratio becomes the stereo threshold or more and a scale of three-dimensional data DG is becomes a correct value. Therefore, when the stereo ratio of the second disparity image data SG2 is the stereo threshold or more, it can be deemed that the relative position between the third camera 30C and the fourth camera 30D of the second stereo camera 302 has not been changed. In other words, it can be predicted that the scale of the second three-dimensional data DG2 is a correct value. Therefore, in the present embodiment, the second adjustment unit 104 uses the scale of the second three-dimensional data DG2 as the reference scale.

As described above, the first stereo camera 301 photographs a distant view region of a photographing subject SB. The second stereo camera 302 photographs a near view region of the photographing subject SB. In the present embodiment, the first stereo camera 301 and the second stereo camera 302 photograph the photographing subject SB such that the distant view region partly overlaps with the near view region.

In such an overlapping region between the distant view region and the near view region of the photographing subject SB, the second adjustment unit 104 changes the yaw angle α of the external parameter so as to reduce a difference between a scale of the first three-dimensional data DG1 and a scale of the second three-dimensional data DG2.

Figure 18:
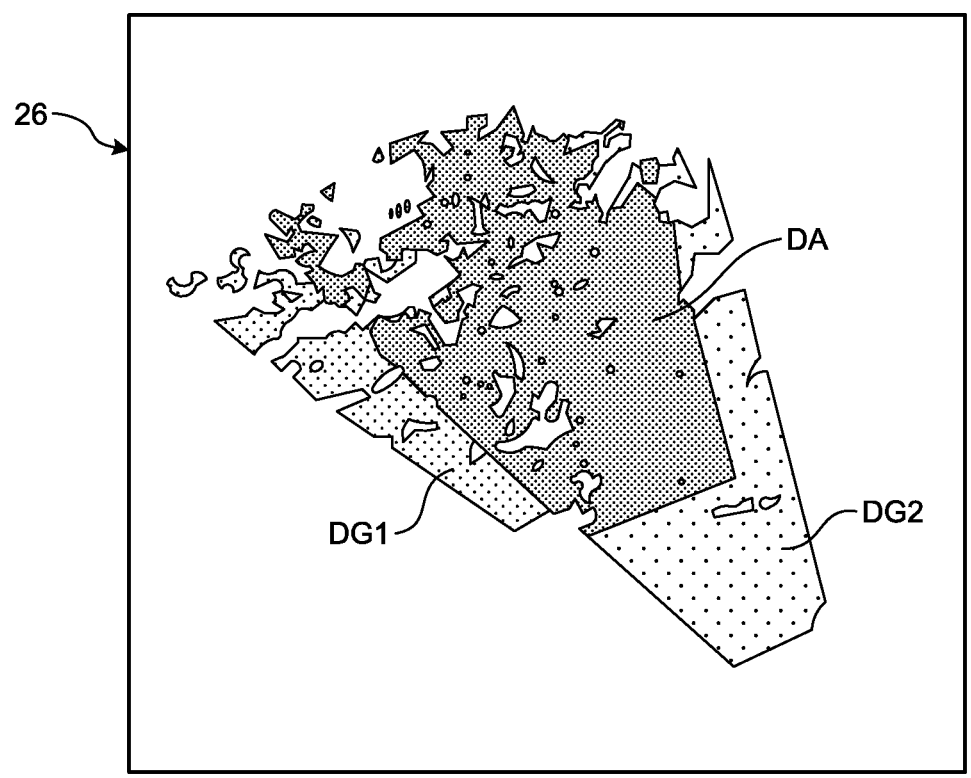
FIG. 18 is a view illustrating examples of first disparity image data and second disparity image data according to the first embodiment.

FIG. 18 is a view illustrating examples of the first three-dimensional data DG1 and the second three-dimensional data DG2 according to the present embodiment.

As illustrated in FIG. 18, the display control unit 108 displays the first three-dimensional data DG1 and the second three-dimensional data DG2 generated by the stereo measurement unit 102.

The first three-dimensional data DG1 is data indicating a distance ZP from the first stereo camera 301 to each of a plurality of locations of the photographing subject SB. The distance ZP is calculated for each of a plurality of pixels PXs of the first disparity image data SG1 on the basis of Equation (1). The map data creation unit 107 creates three-dimensional map data in the camera coordinate system on the basis of the distance ZP calculated for each of the plurality of pixels PXs. Three-dimensional data DG in the vehicle body coordinate system and three-dimensional data DG in the global coordinate system are created by applying coordinate conversion to the three-dimensional data DG in the camera coordinate system. Additionally, a height of each of meshes provided at a predetermined interval (x, y) is calculated by using the three-dimensional data DG in the global coordinate system, thereby creating the first three-dimensional map data (elevation map data) DG1. As for the three-dimensional data DG in the global coordinate system, three-dimensional data exists as many as the number of pixels, but as for the three-dimensional map data, three-dimensional data exists per mesh preliminarily defined.

Additionally, the map data creation unit 107 creates second three-dimensional map data DG2 on the basis of second disparity image data SG2 by a creation method similar to the creation method of the three-dimensional map data of the first disparity image data SG1. The three-dimensional data DG includes disparity image data SG, three-dimensional data of a vehicle body coordinate system and the like, and three-dimensional map data (elevation map data).

As illustrated in FIG. 18, the map data creation unit 107 creates overlapping region data DA that is data of an overlapping region between a distant view region and a near view region of a photographing subject SB, namely, data of an overlapping region between first three-dimensional map data DG1 and second three-dimensional map data DG2.

In the first three-dimensional map data DG1 and the second three-dimensional map data DG2, the overlapping region data DA includes difference data in the Z axis direction at each same position (mesh) or each corresponding position inside the XY plane of the global coordinate system. In the present embodiment, the map data creation unit 107 calculates a difference between height data (z) of the first three-dimensional map data DG1 and height data (z) of the second three-dimensional map data DG2 at each position inside the overlapping region, and adjusts a scale such that a sum of respective differences in the entire overlapping region becomes minimal or equal to or less than a threshold.

In a case where a difference between a scale of the first three-dimensional data DG1 and a scale of the second three-dimensional data DG2 is large, a difference between the height data of the first three-dimensional map data DG1 and the height data of the second three-dimensional map data DG2 at each position inside the overlapping region becomes large, in other words, the sum of the respective differences in the entire overlapping region becomes large.

In the present embodiment, since the scale of the second three-dimensional data DG2 is a correct value (reference scale) as described above, the second adjustment unit 104 adjusts the yaw angle α of the external parameter such that the scale of the first three-dimensional data DG1 conforms to the scale of the second three-dimensional data DG2. Specifically, the second adjustment unit 104 changes the yaw angle α of the external parameter so as to reduce the sum of the differences between the height data of the first three-dimensional data DG1 and the height data of the second three-dimensional data DG2 in the entire overlapping region between the first three-dimensional data DG1 obtained by photographing the distant view region of the photographing subject SB and the second three-dimensional data DG2 obtained by photographing the near view region of the photographing subject SB.

Figure 19:
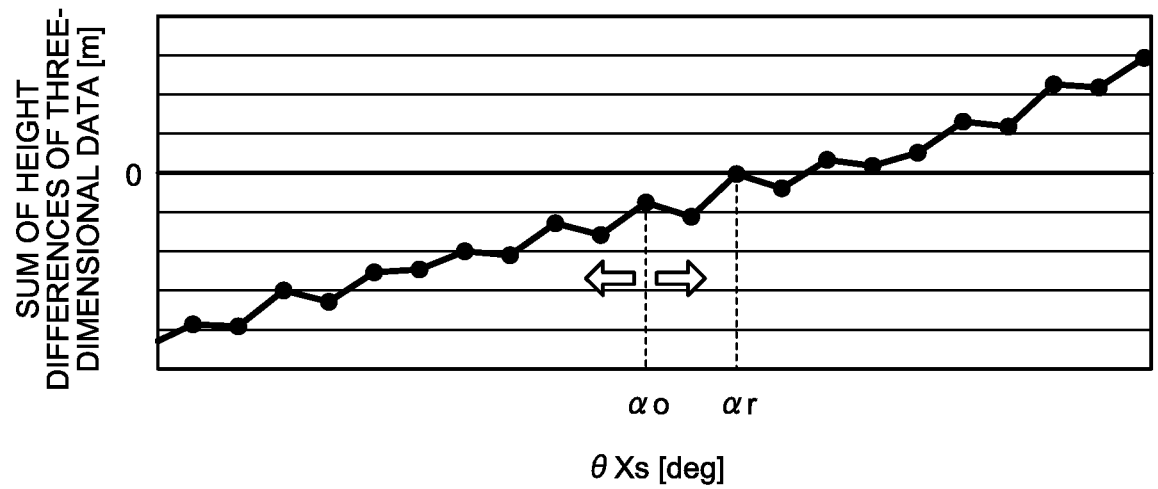
FIG. 19 is a schematic graph to describe an exemplary scale adjustment method by the second adjustment unit according to the first embodiment.

FIG. 19 is a schematic graph to describe exemplary scale adjustment processing by the second adjustment unit 104 according to the present embodiment. In a graph illustrated in FIG. 19, a horizontal axis represents the yaw angle α of the external parameter, and a vertical axis represents the difference from the sum of differences between the height data of the first three-dimensional data DG1 and the height data of the second three-dimensional data DG2.

The second adjustment unit 104 changes the yaw angle α by an increment of a predetermined angle in a predetermined range in the plus direction and the minus direction while setting the reference yaw angle $α_0$ as a reference. Every time the yaw angle α is changed, the stereo measurement unit 102 calculates a difference from the sum of differences between height data of the first three-dimensional data DG1 and height data of the second three-dimensional data DG2. As illustrated in FIG. 19, the difference from the sum of differences between height data of the first three-dimensional data DG1 and height data of the second three-dimensional data DG2 is changed in accordance with change of the yaw angle α. The second adjustment unit 104 determines, as a correct yaw angle αr, a yaw angle α at the time of obtaining a minimum value of the difference from the sum of differences between height data of the first three-dimensional data DG1 and the height data of the second three-dimensional data DG2 in a predetermined range.

Note that a method of determining the correct yaw angle αr may not necessarily be the above-described method. As far as the yaw angle α is the angle at which the difference from the sum of the differences between the height of the first three-dimensional data DG1 and the height data of the second three-dimensional data DG2 is a threshold or less, an arbitrary yaw angle α can be set as the correct yaw angle αr.

After the correct pitch angle βr is determined in Step SP30 and the correct yaw angle αr is determined in Step SP40, the stereo measurement unit 102 executes stereo measurement for the first image data MR1 and the second image data ML1 photographed by the first stereo camera 301 by using the external parameters including the correct pitch angle βr and the correct yaw angle αr. Consequently, the first disparity image data SG1 and the first three-dimensional data DG1 each having a stereo ratio of the stereo threshold value or less and a scale of the correct value are generated (Step SP50).

In the present embodiment, the processing from Step SP10 to Step SP50 described above is executed at a predetermined sampling period. When the camera 30 is physically moved due to some external factor, automatic calibration processing of the stereo camera 300 is executed such that the stereo ratio is improved and the scale becomes a correct value.

<Functions and Effects>

As described above, according to the present embodiment, the control device 100 can adjust a stereo ratio and a scale by changing parameters defined for the first camera 30R and the second camera 30L and executing arithmetic processing on the basis of the changed parameters. Since the stereo ratio is improved, a current topography can be measured in a wide range by the stereo camera 300. Additionally, since the scale is adjusted, three-dimensional data DG measured by the stereo camera 300 becomes highly accurate data with having little difference or error from the actual topography. Consequently, even when a relative position between the first camera 30R and the second camera 30L is changed after external calibration processing, the control device 100 can measure the three-dimensional data DG and disparity image data SG each having the stereo ratio and scale adjusted only by changing the parameters stored in the storage unit 109 without executing complex recalibration processing. Even when the relative position between the first camera 30R and the second camera 30L is changed, deterioration of working efficiency of the excavator 1 is suppressed by executing the automatic calibration processing.

Furthermore, in the present embodiment, the second adjustment unit 104 changes a parameter by utilizing the second three-dimensional data DG2 as a reference scale so as to reduce a difference between a scale of first three-dimensional data DG1 and a scale of second three-dimensional data DG2 in an overlapping region of a distant view region and a near view region. Consequently, the scale of the first three-dimensional data DG1 can be efficiently adjusted.

Meanwhile, in the present embodiment, the stereo ratio may be improved by changing a pitch angle β of an external parameter, but a yaw angle α or a roll angle γ, a shift amount Tx, a shift amount Ty, and a shift amount Tz in Equation (3) may also be changed to improve the stereo ratio, or a plurality of these external parameters may be changed at the same time.

Meanwhile, in the present embodiment, a scale may be adjusted by changing a yaw angle α of an external parameter, but the pitch angle β or the roll angle γ, the shift amount Tx, the shift amount Ty, and the shift amount Tz in Equation (3) may be changed to adjust a scale, or a plurality of these external parameters may be changed at the same time.

Second Embodiment

A second embodiment will be described. In the following description, a constituent element same as or equivalent to that of an above-described embodiment will be denoted by a same reference sign, and a description thereof will be simplified or omitted.

In the above-described embodiment, a scale of first three-dimensional data DG1 generated on the basis of a first stereo camera 301 is adjusted while using, as a reference scale, second three-dimensional data DG2 generated on the basis of a second stereo camera 302. In the present embodiment, a description will be provided for an example of adjusting a scale of three-dimensional data DG by using a reference object as a reference scale. Meanwhile, in the present embodiment also, processing to improve a stereo ratio may be preliminarily executed in accordance with the above-described embodiment.

Figure 20:
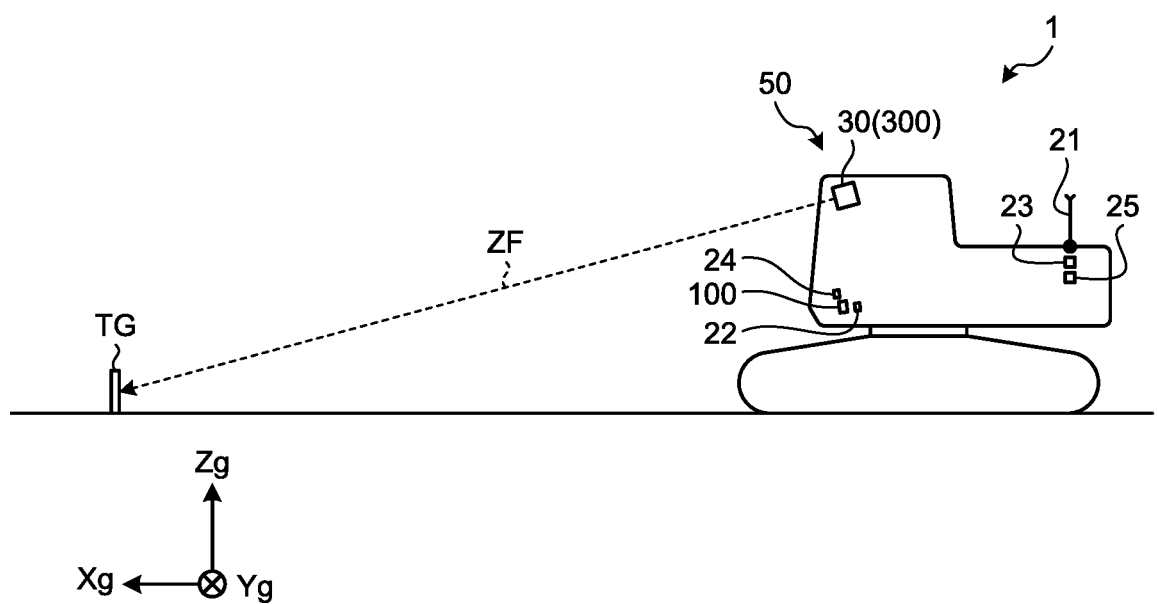
FIG. 20 is a schematic diagram to describe an exemplary position measurement method according to a second embodiment.

FIG. 20 is a schematic diagram to describe an exemplary position measurement method according to the present embodiment. In the present embodiment, a target TG that is a reference object is arranged in a photographing region of a stereo camera 300. The target TG includes, for example, a plate member having a white surface and a reference mark drawn in black on the white surface of the plate member. One or a plurality of reference marks may be provided. In the present embodiment, the reference mark is a circular mark. Note that the target TG may not necessarily have a reference mark.

The target TG is arranged at a predetermined position where a position in a global coordinate system is known. In other words, in the present embodiment, positional data indicating the position of the target TG in the global coordinate system is known data. The positional data of the target TG is received in a positional data calculation unit 105.

As described above, the positional data calculation unit 105 can calculate positional data of a camera 30 in the global coordinate system.

The positional data calculation unit 105 calculates relative positional data between the stereo camera 300 and the target TG in the global coordinate system. The positional data calculation unit 105 calculates a reference distance ZF on the basis of the relative positional data between the stereo camera 300 and the target TG in the global coordinate system.

The second adjustment unit 104 changes a yaw angle α of an external parameter so as to reduce a difference between the reference scale and a scale of three-dimensional data DG. In the present embodiment, the reference scale includes the reference distance ZF corresponding to a distance between the stereo camera 300 and the target TG.

The stereo camera 300 photographs a photographing subject SB including the target TG. The stereo measurement unit 102 generates disparity image data SG in accordance with the above-described embodiment. When a stereo ratio is less than a stereo threshold in generation of the disparity image data SG, the stereo ratio is adjusted by a first adjustment unit 103 in accordance with the above-described embodiment. The stereo measurement unit 102 obtains three-dimensional data DG on the basis of the disparity image data SG.

In the present embodiment, the disparity image data SG or the three-dimensional data DG includes the target TG. The stereo measurement unit 102 calculates the distance ZP from the stereo camera 300 to the target TG on the basis of the disparity image data SG or the three-dimensional data DG.

Which one of pixels in the disparity image data SG or the three-dimensional data DG corresponds to the target TG is determined by, for example, determining a center of a reference mark by image processing. Meanwhile, as far as the pixel corresponding to the target TG can be determined, an arbitrary method may be used. For example, determination may be made on the basis of a shape of the target TG without using any reference mark, or data such as a pixel corresponding to the target TG may be designated by using a predetermined input device.

The second adjustment unit 104 changes the yaw angle α of the external parameter so as to reduce a difference between the reference distance ZF calculated by the positional data calculation unit 105 and the distance ZP between the stereo camera 300 and the target TG in the disparity image data SG or the three-dimensional data DG As described above, in the present embodiment, it is possible to adjust a scale of three-dimensional data DG by using a target TG having a known absolute position. According to the present embodiment, automatic calibration processing for the first stereo camera 301 and automatic calibration processing for the second stereo camera 302 can be executed separately even in case where a relative position between a first camera 30A and a second camera 30B of the first stereo camera 301 and a relative positions between a third camera 30C and a fourth camera 30D of the second stereo camera 302 are both changed.

For example, when the relative position between the first camera 30A and the second camera 30B of the first stereo camera 301 is changed and a stereo ratio of first disparity image data SG1 is degraded, the first adjustment unit 103 can execute adjustment processing to improve the stereo ratio in accordance with the above-described embodiment. After the stereo ratio is improved, the second adjustment unit 104 can adjust a scale of the first three-dimensional data DG1 by photographing a target TG with the first stereo camera 301 having the stereo ratio improved in accordance with the scale adjustment method according to the present embodiment. The similar is applied to the second stereo camera 302.

Note that the position measurement method according to the present embodiment is also applicable to a case where an excavator 1 has only a first stereo camera 301.

Meanwhile, in the present embodiment, the second adjustment unit 104 may execute processing to adjust a scale by using the position measurement method according to the present embodiment instead of executing the processing to improve a stereo ratio by using the first adjustment unit 103.

Note that, in the present embodiment, in a case of using a laser scanner instead of the stereo camera 300, a scale can be adjusted even when the scale becomes inaccurate.

Third Embodiment

A third embodiment will be described. In the following description, a constituent element same as or equivalent to that of above-described embodiments will be denoted by a same reference sign, and a description thereof will be simplified or omitted.

In the present embodiment, a description will be provided for an example in which a scale of three-dimensional data DG is adjusted by using, as a reference scale, a reference object located at an infinite point of a stereo camera 300. Meanwhile, in the present embodiment also, processing to improve a stereo ratio is executed in accordance with the above-described embodiment.

The stereo camera 300 photographs a reference object located at an infinite point of the stereo camera 300, such as such as a cloud in the sky illustrated in FIG. 17. Each of first image data MR photographed by a first camera 30R and second image data ML photographed by a second camera 30L includes image data of the reference object located at the infinite point of the stereo camera 300.

In a case where a measurement point P of the reference object at the infinite point is photographed by the stereo camera 300 having a scale adjusted to a correct value by external calibration processing, a disparity d becomes zero. On the other hand, in a case where the measurement point P of the reference object at the infinite point is photographed by the stereo camera 300 having a scale that is not the correct value, the disparity d does not become zero.

In the present embodiment, the reference scale is a distance to the reference object at the infinite point subjected to stereo measurement in the stereo camera 300 having a scale adjusted to the correct value, in other words, includes infinity.

Figure 21:
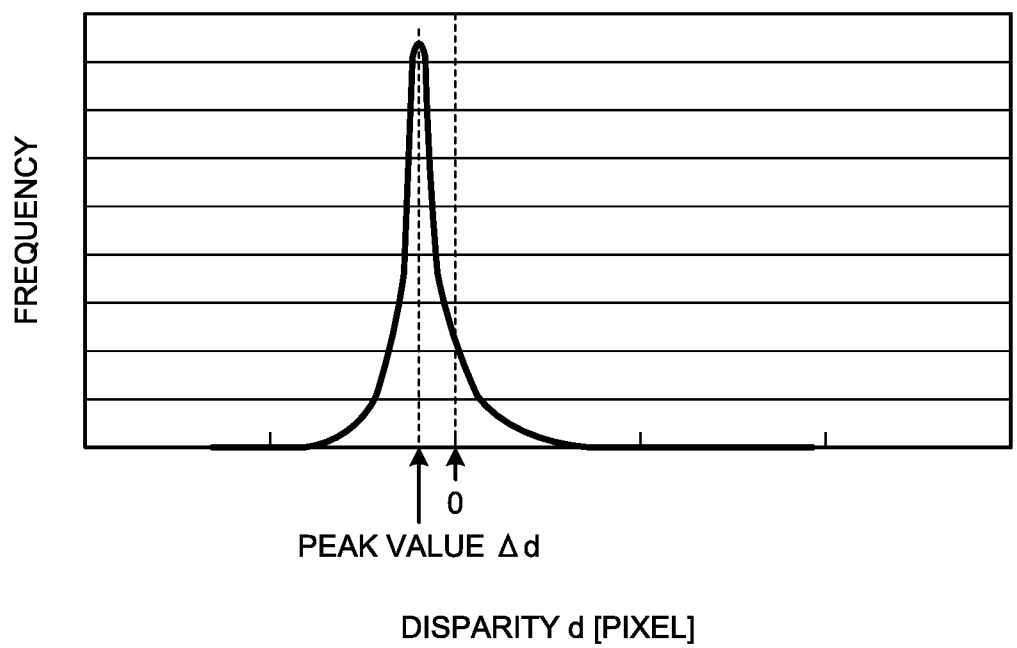
FIG. 21 is a schematic graph to describe an exemplary position measurement method according to a third embodiment.

FIG. 21 is a schematic graph to describe an exemplary position measurement method according to the present embodiment. FIG. 21 is a histogram graph illustrating a relation between a disparity d generated in a pixel in which each measurement point P of a photographing subject SB is projected and a frequency as a result of accumulating disparities d generated in respective pixels of an entire disparity image data SG at the time of photographing, with the stereo camera 300, the photographing subject SB in which an object existing at an infinite point occupies a large proportion as illustrated in FIG. 17, for example. In the graph illustrated in FIG. 21, a horizontal axis represents the disparity d, and a vertical axis represents the frequency of the disparity d.

In a case where a proportion of the object like a cloud existing at the infinite point is large in the photographing subject SB, a peak value Δd of the frequency is generated at the disparity d corresponding to the infinite point as illustrated in FIG. 21. In a case of photographing the object at the infinite point with the stereo camera 300 having a scale adjusted to a correct value by external calibration processing, the frequency of the disparity d shows a peak value Δd when the disparity d is zero. On the other hand, in a case of photographing the object at the infinite point with the stereo camera 300 having a scale that is not the correct value, the frequency of the disparity d shows a peak value Δd when the disparity d is not zero.

A second adjustment unit 104 changes a yaw angle α of an external parameter such that a disparity d between image data of a reference object (at the infinite point in the present embodiment) in first image data MR and image data of a reference object in second image data ML conforms to a reference disparity $d_0$ (zero in the present embodiment). In other words, in a case where a peak of the disparity d at the time of photographing the reference object at the infinite point is not zero, the second adjustment unit 104 changes the yaw angle α of the external parameter such that the peak of the disparity d becomes zero.

Figure 22:
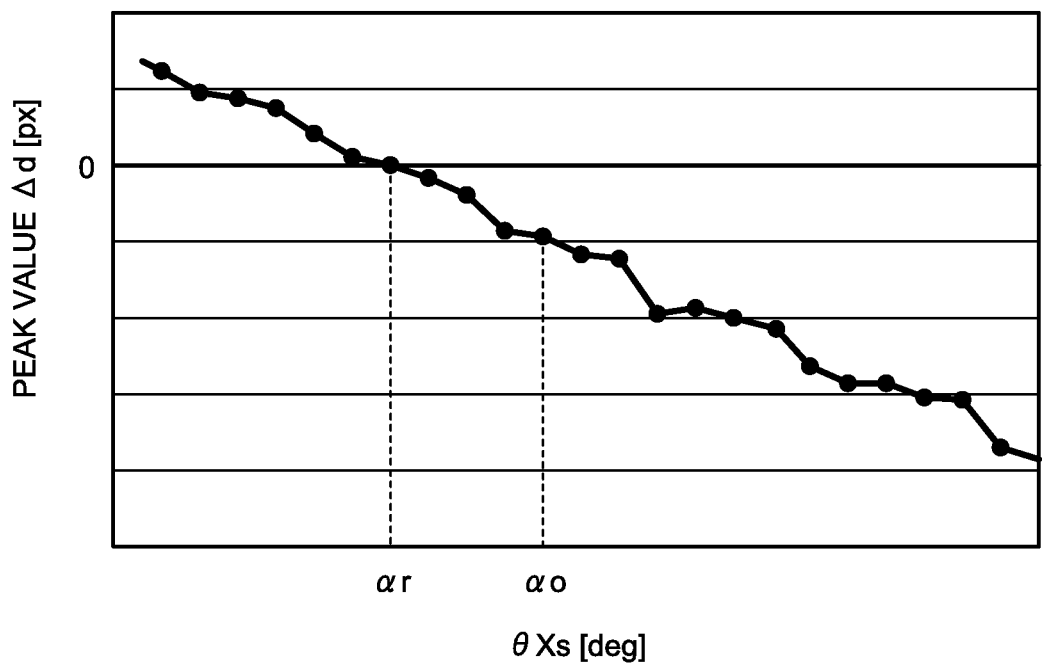
FIG. 22 is a schematic graph to describe an exemplary scale adjustment method by a second adjustment unit according to the third embodiment.

FIG. 22 is a schematic graph to describe an exemplary scale adjustment method by the second adjustment unit 104 according to the present embodiment. In a graph illustrated in FIG. 22, a horizontal axis represents a yaw angle α of an external parameter, and a vertical axis represents a peak value Δd of a disparity d at the time of photographing a measurement point P of an object existing at an infinite point, in other words, the vertical axis represents a peak value Δd of the disparity d in which the frequency of the disparity d shows a peak at the time of photographing a photographing subject SB in which the object existing at the infinite point occupies a large proportion as illustrated in FIG. 17.

The second adjustment unit 104 changes the yaw angle α by an increment of a predetermined angle in a predetermined range while setting a reference yaw angle $α_0$ as a reference. The stereo measurement unit 102 calculates, for every changed yaw angle α, a peak value of the frequency of the disparity d. As illustrated in FIG. 22, the disparity d in each pixel of disparity image data SG is changed on the basis of change in the yaw angle α. The second adjustment unit 104 determines, as a correct yaw angle αr, a yaw angle α when a minimum value of a difference between the reference disparity $d_0$ and the disparity d is obtained in the predetermined range. In other words, the second adjustment unit 104 determines, as the correct yaw angle αr, a yaw angle α in which the peak value of the frequency of the disparity d at a changed yaw angle α is closest to zero. Meanwhile, the second adjustment unit 104 may also determine, as the correct yaw angle αr, a yaw angle α when the difference between the reference disparity $d_0$ and the disparity d becomes a disparity threshold or less in the predetermined range. The disparity threshold is a threshold defined for the difference between the reference disparity $d_0$ and the disparity d.

As described above, in the present embodiment, a scale of three-dimensional data DG can be adjusted by using an object existing at an infinite point. In the present embodiment also, automatic calibration processing for a first stereo camera 301 and automatic calibration processing for a second stereo camera 302 can be executed separately even in a case where a relative position between a first camera 30A and a second camera 30B of the first stereo camera 301 and a relative position between a third camera 300 and a fourth camera 30D of the second stereo camera 302 are both changed.

Note that the position measurement method according to the present embodiment is also applicable to a case where an excavator 1 has only a first stereo camera 301.

Meanwhile, in the present embodiment, the second adjustment unit 104 may execute processing to adjust a scale by using the position measurement method according to the present embodiment instead of executing the processing to improve a stereo ratio by using the first adjustment unit 103.

Note that, in the present embodiment, in a case of using a laser scanner instead of the stereo camera 300, a scale can be adjusted even when the scale becomes inaccurate.

Fourth Embodiment

A fourth embodiment will be described. In the following description, a constituent element same as or equivalent to that of above-described embodiments will be denoted by a same reference sign, and a description thereof will be simplified or omitted.

In the above-described embodiments, a parameter changed by each of a first adjustment unit 103 and a second adjustment unit 104 is an external parameter that defines a relative position between a first camera MR and a second camera ML.

In the present embodiment, a description will be provided for an example in which a parameter changed by each of the first adjustment unit 103 and the second adjustment unit 104 is an internal parameter in each of a first camera 30R and a second camera 30L.

The internal parameter defines specific data of each of the first camera 30R and the second camera 30L. The internal parameter includes, for example, a focal distance of an optical system of a camera 30, an intersection between an optical center of the optical system of the camera 30 and an imaging surface of an image sensor, and a positional deviation amount from an image center of the image sensor.

In the present embodiment, the internal parameter includes a position of an image sensor 31L of the second camera 30L with respect to an optical axis of an optical system of the second camera 30L in a direction parallel to an Xs axis and a Ys axis. In other words, in the present embodiment, the internal parameter includes a position of an image center in the Xs axis direction and the Ys axis direction.

For example, the image sensor may be moved inside the camera 30 due to an external factor. For example, a position of the image sensor may be moved due to influence of heat. When the position of the image sensor is moved, the position of the image center indicating an intersection between the optical axis of the optical system of the camera 30 and the imaging surface of the image sensor is changed. When the position of the image center is changed, a stereo ratio of disparity image data SG may be degraded or a difference between a scale of three-dimensional data DG and a correct value of the scale may be increased.

In the present embodiment, the first adjustment unit 103 adjusts a position of an image center in the Xs axis direction by changing, as an internal parameter, a position of an image sensor 31L in the Xs axis direction in order to adjust the stereo ratio.

In the present embodiment, the second adjustment unit 104 adjusts a position of an image center in the Ys axis direction by changing, as an internal parameter, the position of the image sensor 31L in the Ys axis direction in order to adjust the scale.

Specific data of the camera 30 is defined by Equation (4) below which includes a plurality of internal parameters described above.

$$S \begin{pmatrix} u \\ v \\ 1 \end{pmatrix} \begin{pmatrix} f \times su & 0 & u_0 & 0 \\ 0 & f \times sv & v_0 & 0 \\ 0 & 0 & 1 & 0 \end{pmatrix} \begin{pmatrix} X \\ Y \\ Z \\ 1 \end{pmatrix} \quad (4)$$

In Equation (4), (X, Y, Z) represents a position of an image center of the second camera 30L in a global coordinate system. s represents a distance or scale in a Zs axis direction in a camera coordinate system. $\mu_0$ represents a position in the Xs axis direction in the camera coordinate system. f represents a focal distance. su represents a pixel ratio in the Xs axis direction (ratio with respect to the Ys axis direction). sv represents a pixel ratio in the Ys axis direction (ratio with respect to the Xs axis direction) in the camera coordinate system. $u_0$ represents a position of an image center of the second camera 30L in the Xs axis direction in the camera coordinate system. $v_0$ represents a position of an image center of the second camera 30L in the Ys axis direction in the camera coordinate system.

Equation (4) includes: a camera internal matrix defined by a yaw angle α, a pitch angle β, a roll angle γ, the position $u_0$, and the position $v_0$ related to the second camera 30L; a camera external matrix defined by a plurality of parameters indicating a position and a posture of the second camera 30L; and a translation vector defined by a position X, a position Y, and a position Z in the global coordinate system. Equation (4) is a conversion equation to convert the position $u_0$ of the image center in the Xs axis direction and the position $v_0$ of the image center in the Ys axis direction in the camera coordinate system of the second camera 30L to a position u of the image center in the Xs axis direction and the position v of the image center in the Ys axis direction in a camera coordinate system of the first camera 30R.

The first adjustment unit 103 changes the position $u_0$ so as to increase the stereo ratio. Changing the position $u_0$ is similar to changing a pitch angle β described in the above-described embodiment.

In the present embodiment, a storage unit 109 stores a reference position of the image sensor 31L in the Xs axis direction. The reference position of the image sensor 31L in the Xs axis direction includes a reference position of the image center of the second camera 30L in the Xs axis direction. The reference position in the Xs axis direction is a position of an image center in which a stereo ratio has been adjusted to a stereo threshold or more in external calibration processing at the time of factory shipment. The first adjustment unit 103 calculates a maximum value of the stereo ratio by changing the position of the image sensor 31L in a predetermined range including the reference position in the Xs axis direction.

The second adjustment unit 104 changes the position $v_0$ so as to reduce a difference between a reference scale and a scale of the three-dimensional data DG. Changing the position $v_0$ is similar to changing a yaw angle α described in the above-described embodiments.

In the present embodiment, the storage unit 109 stores a reference position of the image sensor 31L in the Ys axis direction. The reference position of the image sensor 31L in the Ys axis direction includes a reference position of the image center of the second camera 30L in the Ys axis direction. The reference position in the Ys axis direction is a position of an image center in which a difference between the reference scale and the scale of the three-dimensional data DG has been adjusted to a scale threshold or less in the external calibration processing at the time of factory shipment. The second adjustment unit 104 calculates a minimum value of the difference between the reference scale and the scale of the three-dimensional data DG by changing the position of the image sensor 31L in a predetermined range including the reference position in the Ys axis direction.

As described above, the first adjustment unit 103 and the second adjustment unit 104 can improve a stereo ratio of disparity image data SG and set a scale of three-dimensional data DG close to the correct value by adjusting an internal parameter of the camera 30.

Fifth Embodiment

A fifth embodiment will be described. In the following description, a constituent element same as or equivalent to that of above-described embodiments will be denoted by a same reference sign, and a description thereof will be simplified or omitted.

Figure 23:
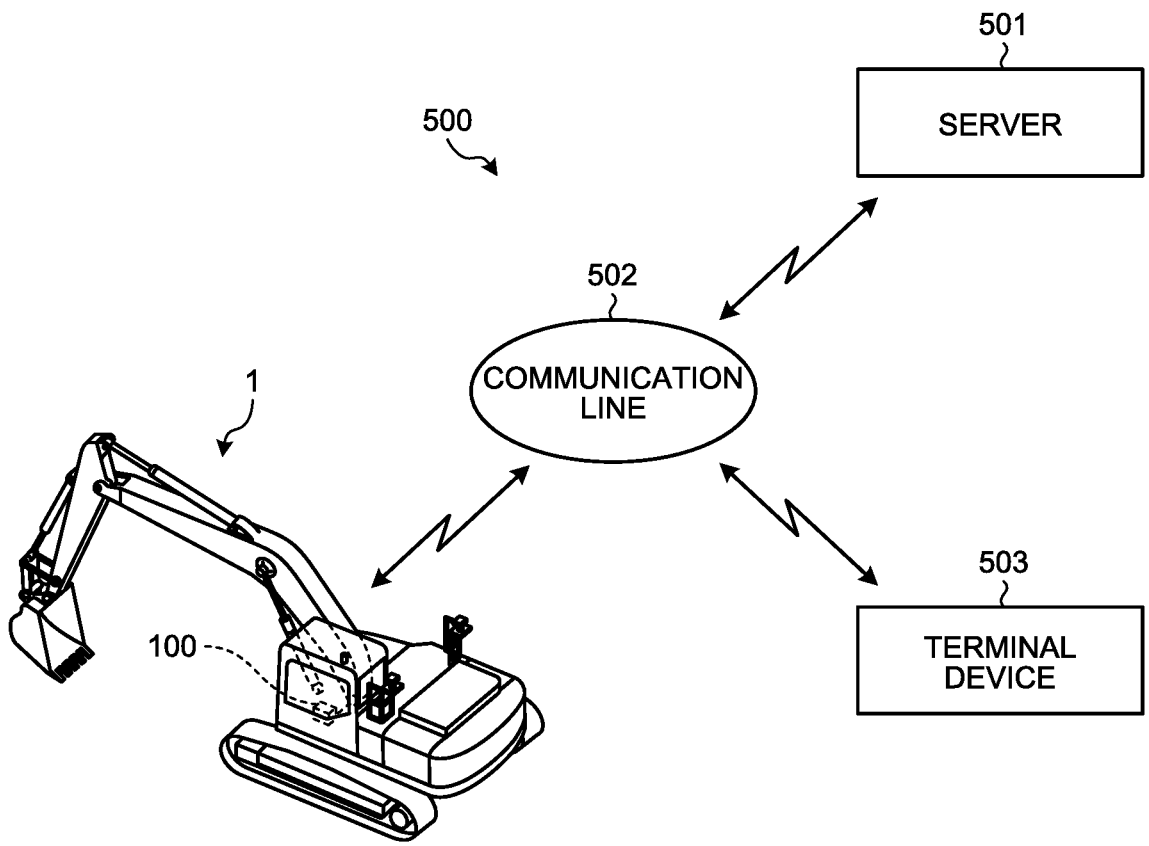
FIG. 23 is a view schematically illustrating an exemplary position measurement system according to a fifth embodiment.

FIG. 23 is a view schematically illustrating an exemplary position measurement system 500 according to the present embodiment. In the present embodiment, a control device 100 of an excavator 1 can execute, via a communication line 502, data communication with a server 501 and a terminal device 503 each provided at a remote place from the excavator 1. The server 501 includes a computer system. The terminal device 503 includes a personal computer or a portable terminal. The communication line 502 includes at least one of the Internet, a local area network (LAN), a cellular phone communication network, and a satellite communication network.

In the present embodiment, the server 501 has a part or all of functions of the control device 100. In other words, the server 501 includes at least one of an image data acquisition unit 101, a stereo measurement unit 102, a first adjustment unit 103, a second adjustment unit 104, a positional data calculation unit 105, a work unit positional data calculation unit 106, a map data creation unit 107, a display control unit 108, a storage unit 109, and an input/output unit 110.

Image data captured by a camera 30 of the excavator 1, positional data of a swing body 3 detected by a position detector 23, posture data of the swing body 3 detected by a posture detector 24, azimuth direction data of the swing body 3 detected by an azimuth direction detector 25 are supplied to the server 501 via the communication line 502.

For example, in a case where the server 501 includes the stereo measurement unit 102, first adjustment unit 103, second adjustment unit 104, and storage unit 109, the server 501 can execute stereo measurement, change a parameter so as to increase a stereo ratio, and change a parameter so as to set a scale to a correct value on the basis of image data photographed by the camera 30 and supplied via the communication line 502.

Meanwhile, in the present embodiment, the terminal device 503 may also have a part or all of the functions of the control device 100. In other words, the terminal device 503 may include at least one of the image data acquisition unit 101, stereo measurement unit 102, first adjustment unit 103, second adjustment unit 104, positional data calculation unit 105, work unit positional data calculation unit 106, map data creation unit 107, display control unit 108, storage unit 109, and input/output unit 110.

Note that, in the present embodiment, a display device 26 controlled by the display control unit 108 may be provided at the excavator 1, may be connected to the server 501, or may be connected to the terminal device 503.

Sixth Embodiment

A sixth embodiment will be described. In the following description, a constituent element same as or equivalent to that of above-described embodiments will be denoted by a same reference sign, and a description thereof will be simplified or omitted.

In the second embodiment described above, a scale of three-dimensional data DG is adjusted by using a target TG. In the present embodiment, a description will be provided for an example in which a scale of three-dimensional data DG is adjusted by using a work unit 2 as a reference scale. Meanwhile, in the present embodiment also, processing to improve a stereo ratio is executed in accordance with the above-described embodiments.

Figure 24:
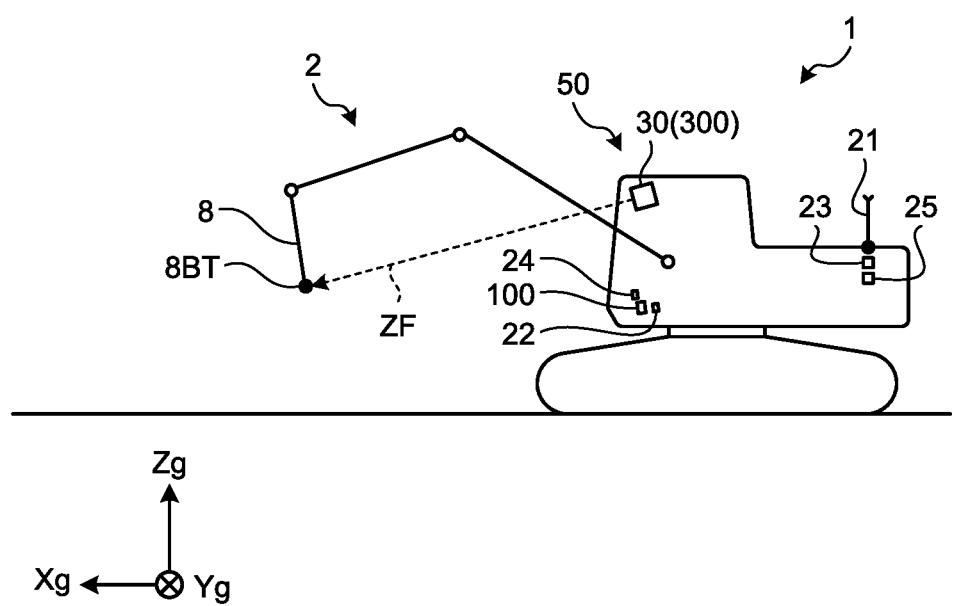
FIG. 24 is a schematic view to describe an exemplary position measurement method according to a sixth embodiment.

FIG. 24 is a schematic view to describe an exemplary position measurement method according to the present embodiment. In the present embodiment, a blade edge 8BT of a bucket 8 that is a reference object is arranged in a photographing region of a stereo camera 300. For example, the blade edge 8BT is arranged in a photographing region of the stereo camera 300 in a state in that a posture of the work unit 2 is adjusted such that a distance in an Xm axis direction between the stereo camera 300 and the blade edge 8BT becomes longest.

A work unit positional data calculation unit 106 can calculate a position of the blade edge 8BT of the bucket 8 in a global coordinate system. Additionally, a positional data calculation unit 105 can calculate positional data of a camera 30 in the global coordinate system.

The positional data calculation unit 105 calculates relative positional data between the stereo camera 300 and the blade edge 8BT in the global coordinate system.

A second adjustment unit 104 changes a yaw angle α of an external parameter so as to reduce a difference between a reference scale and a scale of three-dimensional data DG. In the present embodiment, the reference scale includes a reference distance ZF that is a distance between the stereo camera 300 and the blade edge 8BT.

As described above, in the present embodiment, the scale of the three-dimensional data DG can be adjusted by using the work unit 2.

Meanwhile, in the present embodiment, a work unit of an excavator different from the excavator 1 may also be used as a reference scale. Similar to the excavator 1 according to the present embodiment, as far as the different excavator includes a work unit angle detector 22, a position detector 23, a posture detector 24, an azimuth direction detector 25, and a control device 100, the different excavator can acquire an absolute position of a blade edge of a bucket of the work unit of the different excavator. The excavator 1 can acquire relative positional data between the stereo camera 300 and the blade edge of the different excavator by transmitting absolute positional data indicating the absolute position of the blade edge of the different excavator to the excavator 1 according to the present embodiment via a communication device.

Meanwhile, in each of the above-described embodiments, the description has been provided for the example in which the four cameras 30 and two stereo cameras 300 are provided in an excavator 1. It is sufficient that at least two cameras 30 are provided on the excavator 1. Additionally, in the above-described second and third embodiments, it is sufficient that at least one stereo camera 300 is provided.

Meanwhile, in each of the above-described embodiments, it is assumed that a stereo ratio indicates a ratio of pixels in which stereo measurement is successfully performed among a plurality of pixels of disparity image data SG subjected to stereo measurement. The stereo ratio may have another definition. For example, the stereo ratio may indicate the total number of pixels in which stereo measurement is successfully performed among a plurality of pixels of disparity image data subjected to stereo measurement.

Meanwhile, a scale is changed by adjusting a yaw angle or the like, in words, adjusting a disparity d as scale adjustment of three-dimensional data in each of the above-described embodiments, but not limited to the embodiments, a scale may also be changed by adjusting others, for example, adjusting b (distance between cameras) or f (focal distance) in Equation 1.

Additionally, in each of the above-described embodiments, it is assumed that a work machine 1 is an excavator. As far as the work machine 1 is a work machine that can construct a construction object, the work machine may be a mining machine that can mine a construction object and a haulage machine that can haul earth and sand. The work machine 1 may be, for example, a wheel loader, a bulldozer or a dump truck.

REFERENCE SIGNS LIST

1 Excavator (work machine)
1B Vehicle body
2 Work unit
3 Swing body
4 Operating room
4S Operator's seat
5 Travel body
5A Crawler
5B Crawler
6 Boom
7 Arm
8 Bucket
8BT Blade edge
10 Boom cylinder
11 Arm cylinder
12 Bucket cylinder
13 Boom pin
14 Arm pin
15 Bucket pin
16 Boom stroke sensor
17 Arm stroke sensor
18 Bucket stroke sensor
20 Detection system
21 GPS antenna
22 Work unit angle detector
23 Position detector
24 Posture detector
25 Azimuth direction detector
26 Display device
30 Camera 30A First camera
30B Second camera
30C Third camera
30D Fourth camera
30L Second camera
30R First camera
31L Image sensor
31R Image sensor
35 Operating device
35L Left operating lever
35R Right operating lever
50 Position measurement system
100 Control device
101 Image data acquisition unit
102 Stereo measurement unit
103 First adjustment unit
104 Second adjustment unit
105 Positional data calculation unit
106 Work unit positional data calculation unit
107 Map data creation unit
108 Display control unit
109 Storage unit
110 Input/output unit
300 Stereo camera
301 First stereo camera
302 Second stereo camera
500 Position measurement system
501 Server
502 Communication line
AX1 Rotation axis
AX2 Rotation axis
AX3 Rotation axis
DG Three-dimensional data
ER Point
EL Point
BL Base line
MR First image data
ML Second image data
OR Optical center
OL Optical center
P Measurement point
SB Photographing subject
SG Disparity image data
Zr Swing axis

The invention claimed is:

1. A position measurement system comprising:
an image data acquisition unit configured to acquire first image data photographed by a first camera of a first stereo camera provided at a work machine and second image data photographed by a second camera of the first stereo camera;
a stereo measurement unit configured to execute stereo measurement on the basis of the first image data, the second image data, and parameters related to the first camera and the second camera;
a first adjustment unit configured to change at least a part of the parameters to adjust a stereo ratio of first disparity image data subjected to stereo measurement; and
a second adjustment unit configured to change at least a part of the parameters to adjust a scale of first three-dimensional data obtained from the first disparity image data,
wherein the second adjustment unit adjusts a disparity of the first disparity image data to adjust a scale of the first three-dimensional data, and whereby three-dimensional data and disparity image data are generated by stereo measurement.

2. The position measurement system according to claim 1, wherein
the parameter includes an external parameter that defines a relative position between the first camera and the second camera,
the external parameter includes a pitch angle of the second camera, and
the first adjustment unit changes the pitch angle.

3. The position measurement system according to claim 1, wherein
the parameter includes an external parameter that defines a relative position between the first camera and the second camera,
the external parameter includes a yaw angle of the second camera, and
the second adjustment unit changes the yaw angle.

4. The position measurement system according to claim 1, further comprising a second stereo camera including a third camera and a fourth camera, wherein
the second adjustment unit adjusts a scale of the first three-dimensional data so as to reduce a difference between a scale of the first three-dimensional data and a scale of second three-dimensional data generated on the basis of third image data acquired from the third camera and fourth image data acquired from the fourth camera.

5. The position measurement system according to claim 1, wherein
the second adjustment unit changes the parameter so as to reduce a difference between a reference distance from the first stereo camera to a reference object and a distance from the first stereo camera to the reference object in the first three-dimensional data, the reference distance being calculated on the basis of positional data of the first stereo camera and positional data of the reference object.

6. The position measurement system according to claim 1, wherein
each of the first image data and the second image data includes image data of a reference object located at an infinite point of the first stereo camera, and
the second adjustment unit changes the parameter such that a peak of a disparity in first disparity image data measured on the basis of the first image data and the second image data becomes zero.

7. A position measurement system comprising:
an image data acquisition unit configured to acquire first image data photographed by a first camera of a stereo camera provided at a work machine and second image data photographed by a second camera of the stereo camera;
a stereo measurement unit configured to execute stereo measurement on the basis of the first image data, the second image data, and parameters related to the first camera and the second camera; and
a second adjustment unit configured to change at least a part of the parameters so as to reduce a difference between a reference distance from the stereo camera to a reference object and a distance from the stereo camera to the reference object in disparity image data generated by the stereo measurement unit, the reference distance being calculated on the basis of absolute positional data of the stereo camera and absolute positional data of the reference object, wherein the second adjustment unit adjusts a disparity of the disparity image data generated by the stereo measurement unit to adjust a scale of three-dimensional data, and whereby three-dimensional data and disparity image data are generated by the stereo measurement.

8. A position measurement system comprising:

an image data acquisition unit configured to acquire first image data photographed by a first camera of a stereo camera provided at a work machine, and including a reference object located at an infinite point of the stereo camera and second image data photographed by a second camera of the stereo camera and including the reference object;

a stereo measurement unit configured to execute stereo measurement on the basis of the first image data, the second image data, and parameters related to the first camera and the second camera; and a second adjustment unit configured to change at least a part of the parameters such that a peak of a disparity in first disparity image data measured on the basis of the first image data and the second image data becomes zero, wherein the second adjustment unit adjusts a disparity of the first disparity image data to adjust a scale of three-dimensional data, and whereby three-dimensional data and disparity image data are generated by the stereo measurement.

9. A work machine comprising a position measurement system according to claim 8.

10. A work machine comprising a position measurement system according to claim 1.

11. A work machine comprising a position measurement system according to claim 7.

* * * * *